(12) United States Patent
Yerramalli et al.

(10) Patent No.: US 10,511,405 B2
(45) Date of Patent: Dec. 17, 2019

(54) RESOURCE MAPPING TO HANDLE BURSTY INTERFERENCE

(71) Applicant: QUALCOMM Incorporated, San Diego, CA (US)

(72) Inventors: Srinivas Yerramalli, San Diego, CA (US); Tao Luo, San Diego, CA (US); Durga Prasad Malladi, San Diego, CA (US); Naga Bhushan, San Diego, CA (US); Yongbin Wei, La Jolla, CA (US); Tingfang Ji, San Diego, CA (US); Aleksandar Damnjanovic, Del Mar, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/463,825

(22) Filed: Mar. 20, 2017

(65) Prior Publication Data

US 2017/0195081 A1    Jul. 6, 2017

Related U.S. Application Data

(63) Continuation of application No. 14/471,138, filed on Aug. 28, 2014, now Pat. No. 9,634,802.
(Continued)

(51) Int. Cl.
*H04L 1/00* (2006.01)
*H04L 1/18* (2006.01)
(Continued)

(52) U.S. Cl.
CPC .......... *H04L 1/0006* (2013.01); *H04L 1/0034* (2013.01); *H04L 1/0071* (2013.01);
(Continued)

(58) Field of Classification Search
None
See application file for complete search history.

(56) References Cited

U.S. PATENT DOCUMENTS

| 6,768,727 B1 * | 7/2004 | Sourour | H04W 52/42 370/335 |
| 2004/0199846 A1 | 10/2004 | Matsumoto et al. | |

(Continued)

FOREIGN PATENT DOCUMENTS

| CN | 101883072 A | 11/2010 |
| EP | 1788710 A1 | 5/2007 |

(Continued)

OTHER PUBLICATIONS

Alcatel-Lucent: "Performance Evaluation of Codeblock Based Flexible-Size Channel Interleaving", R1-072659, 3GPP TSG RAN WG1 #49bis, Jun. 29, 2007, pp. 1-14.
(Continued)

*Primary Examiner* — Daniel F. McMahon
(74) *Attorney, Agent, or Firm* — Norton Rose Fulbright LLP

(57) ABSTRACT

Resource mapping and coding schemes to handle bursty interference are disclosed that provide for spreading the modulated symbols for one or more transmission code words over more symbols in the time-frequency transmission stream. Certain aspects allow for the modulated symbols to be based on bits from more than one code word. Other aspects also provide for re-mapping code word transmission sequences for re-transmissions based on the number of re-transmissions requested by the receiver. Additional aspects provide for layered coding that uses a lower fixed-size constellation to encode/decode transmissions in a layered manner in order to achieve a larger-size constellation encoding. The layered encoding process allows the transmitter and receiver to use different coding rates for each (Continued)

coding layer. The layered encoding process also allows interference from neighboring cells to be canceled without knowledge of the actual constellation used to code the interfering neighboring signal.

24 Claims, 15 Drawing Sheets

Related U.S. Application Data

(60) Provisional application No. 61/872,500, filed on Aug. 30, 2013.

(51) Int. Cl.
| | |
|---|---|
| H04L 1/08 | (2006.01) |
| H04L 5/00 | (2006.01) |
| H04L 5/14 | (2006.01) |
| H04L 27/34 | (2006.01) |

(52) U.S. Cl.
CPC .............. *H04L 1/08* (2013.01); *H04L 1/1893* (2013.01); *H04L 5/001* (2013.01); *H04L 5/0044* (2013.01); *H04L 5/0073* (2013.01); *H04L 5/1469* (2013.01); *H04L 27/3488* (2013.01)

(56) References Cited

U.S. PATENT DOCUMENTS

| | | | |
|---|---|---|---|
| 2006/0234628 | A1 | 10/2006 | Horiguchi et al. |
| 2007/0157065 | A1* | 7/2007 | Pons .................. H03M 13/1102 714/758 |
| 2008/0092009 | A1 | 4/2008 | Miyata et al. |
| 2010/0104044 | A1 | 4/2010 | Kishigami et al. |
| 2010/0195764 | A1 | 8/2010 | Murakami |
| 2010/0215007 | A1 | 8/2010 | Zhang et al. |
| 2011/0007658 | A1 | 1/2011 | Lindoff et al. |
| 2011/0051825 | A1 | 3/2011 | Tao et al. |
| 2011/0080975 | A1 | 4/2011 | Toda et al. |
| 2013/0107705 | A1* | 5/2013 | Dinan ............... H04W 72/0446 370/230 |
| 2013/0114468 | A1* | 5/2013 | Hui ....................... H01Q 3/2611 370/277 |
| 2015/0067435 | A1 | 3/2015 | Yerramalli et al. |
| 2015/0092624 | A1* | 4/2015 | Yao ....................... H04L 5/0055 370/278 |

FOREIGN PATENT DOCUMENTS

| | | |
|---|---|---|
| GB | 2445033 A | 6/2008 |
| JP | H04290316 A | 10/1992 |
| JP | 2003110430 A | 4/2003 |
| JP | 2006203355 A | 8/2006 |
| JP | 2009033623 A | 2/2009 |
| JP | 2009118451 A | 5/2009 |
| JP | 4376905 B2 | 12/2009 |
| WO | WO-2009157184 A1 | 12/2009 |

OTHER PUBLICATIONS

Huawei: "Channel Interleaver and Codeword-to-Layer Mapping for LTE-A Uplink Spatial Multiplexing", R1-092384, 3GPP TSG RAN WG1 meeting #57bis, Jul. 2009, 8 Pages.
International Search Report and Written Opinion—PCT/US2014/053390—ISA/EPO—dated Oct. 27, 2014.
Panasonic: °Channel interleaver for UL OFDM, 3GPP Draft, R1-090258, 3rd Generation Partnership Project (3GPP), Mobile Competence Centre ; 650, Route Des Lucioles ; F-06921 Sophia-Antipolis Cedex , France, No. Ljubljana; Jan. 7, 2009, Jan. 7, 2009 (Jan. 17, 2009), XP050318185, [retrieved on Jan. 7, 2009] section 2.1, figures 1, 3.
Samsung: Code block reordering in HARQ retransmissions., 3GPP Draft; R1-0731579, 3rd Generation Partnership Project (3GPP) , Mobile Competence Centre ; 650, Route Des Lucioles ; F-96921 Sophia-Antipolis Cedex; France, vol. RAN WG1, No. Athens, Greece; Aug. 15, 2007, Aug. 15, 2007 (Aug. 15, 2007), XP050107182, [retrieved on Aug. 15, 2007].

* cited by examiner

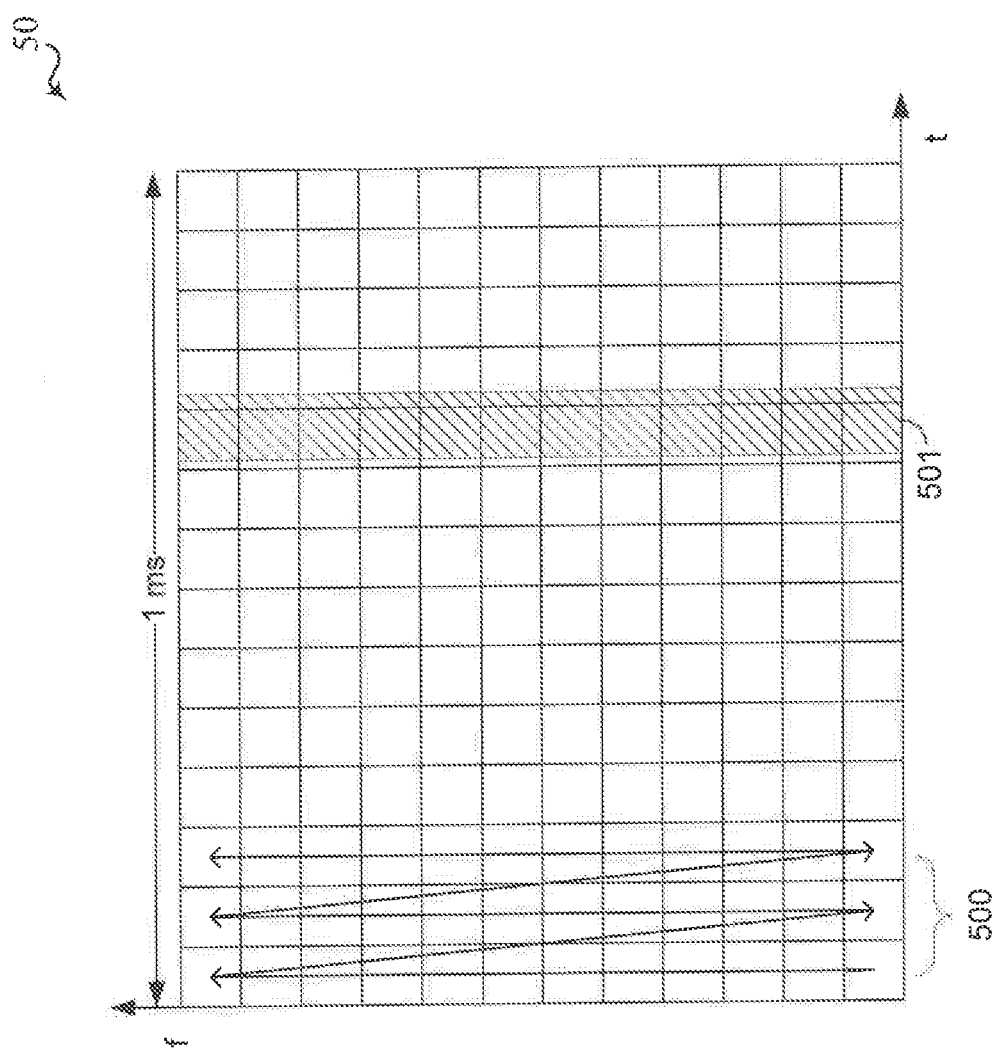

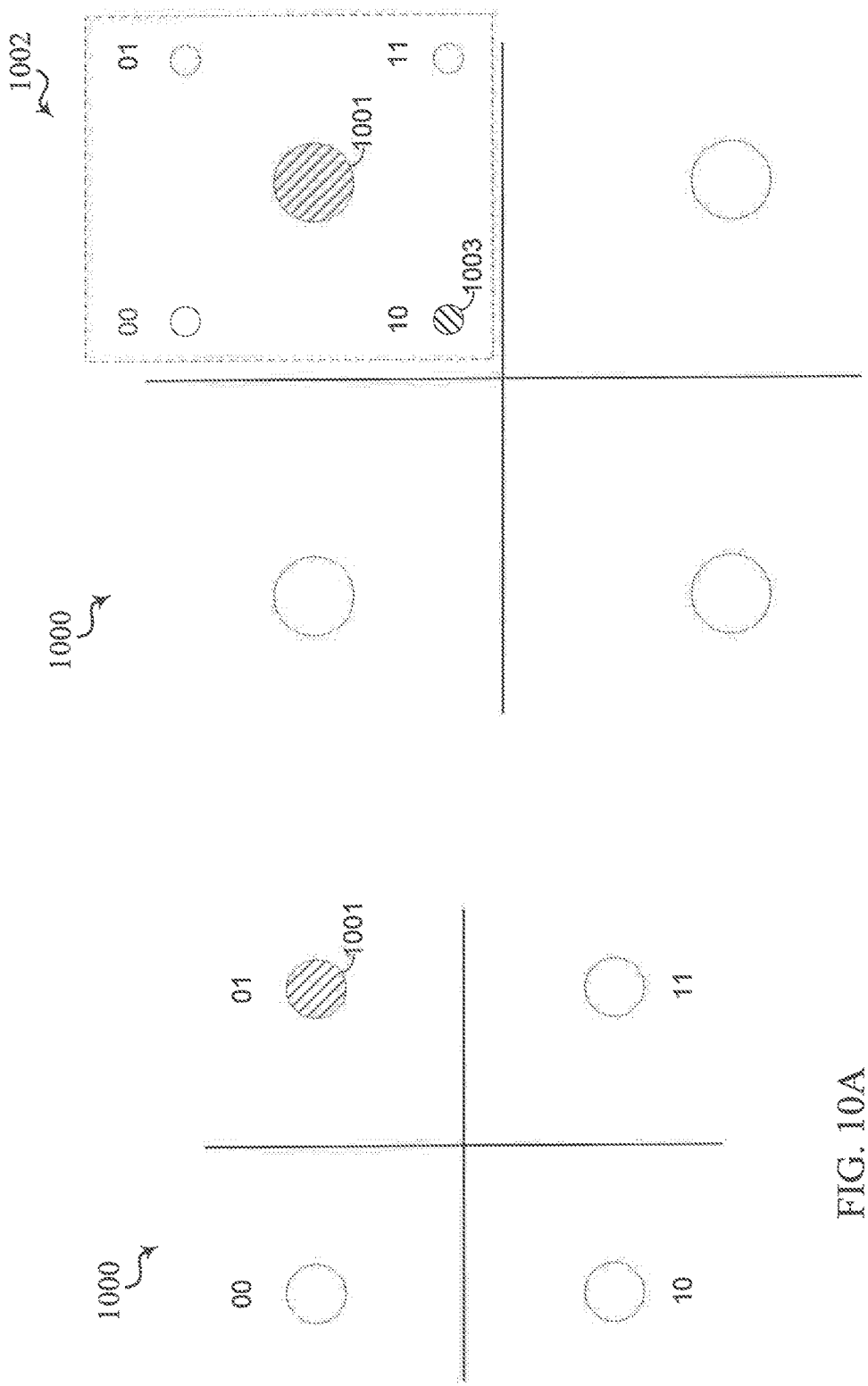

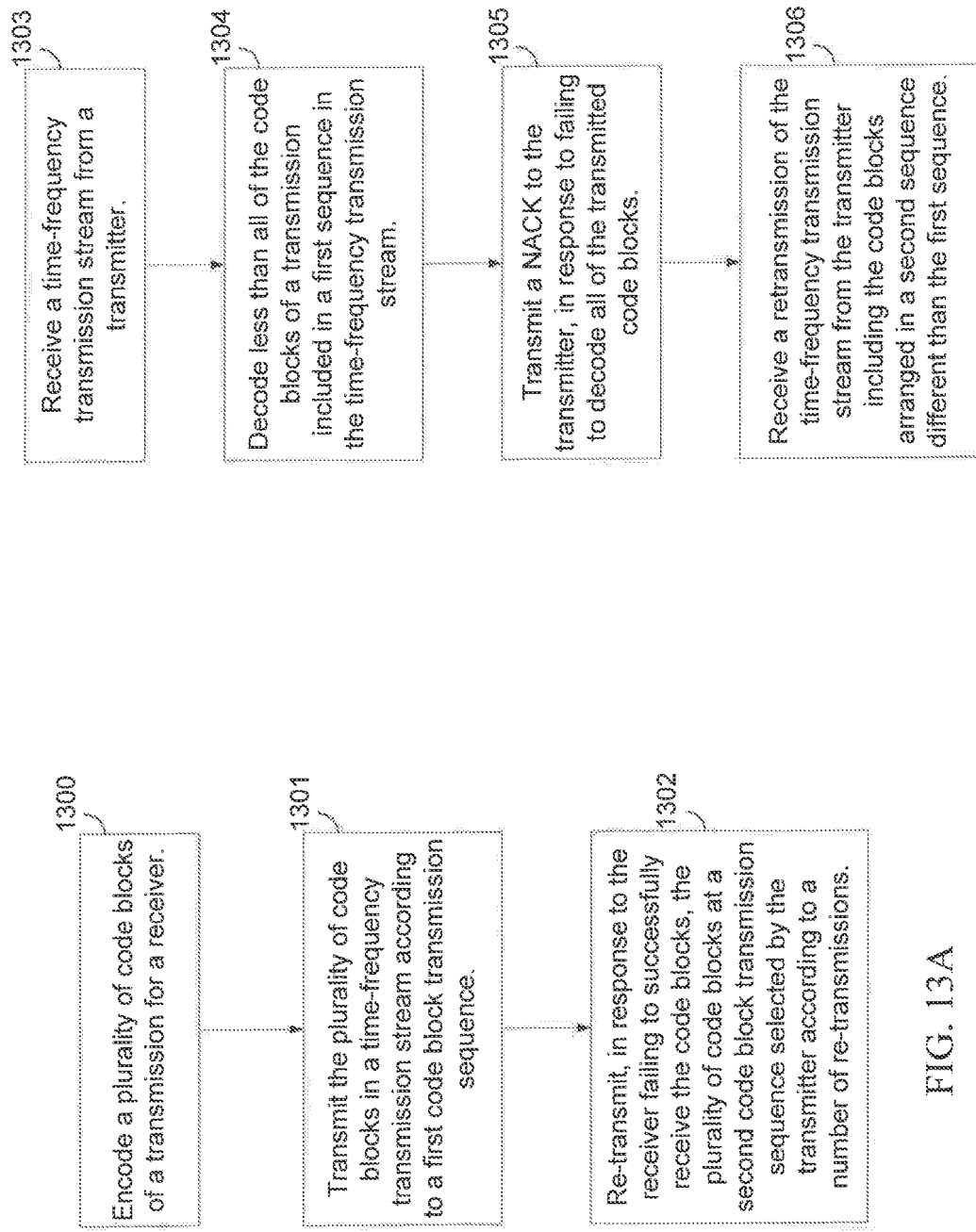

RESOURCE MAPPING TO HANDLE BURSTY INTERFERENCE

CROSS-REFERENCE TO RELATED APPLICATIONS

This application is a continuation of patent application Ser. No. 14/471,138, entitled "RESOURCE MAPPING TO HANDLE BURSTY INTERFERENCE", filed on Aug. 28, 2014, which claims the benefit of U.S. Provisional Patent Application No. 61/872,500, entitled, "RESOURCE MAPPING TO HANDLE BURSTY INTERFERENCE", filed on Aug. 30, 2013, both of which are expressly incorporated by reference herein in their entirety.

BACKGROUND

Field

Aspects of the present disclosure relate generally to wireless communication systems, and more particularly, to resource mapping to handle burst interference in long term evolution (LTE)/LTE-Advanced (LTE-A) communication systems with unlicensed spectrum.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes encoding, at a transmitter, a plurality of bits for one or more code blocks of a transmission, interleaving, by the transmitter, the plurality of bits of each of the one or more code blocks across two or more symbols in a time-frequency transmission stream, and transmitting, by the transmitter to a receiver, the time-frequency transmission stream.

In an additional aspect of the disclosure, a method of wireless communication includes receiving, at a receiver, a time-frequency transmission stream from a transmitter, de-interleaving, by the receiver, a plurality of bits of each of one or more code blocks interleaved across two or more symbols in the time-frequency transmission stream, and decoding, at the receiver, the plurality of bits of the one or more code blocks into a transmission from the transmitter.

In an additional aspect of the disclosure, a method of wireless communication includes encoding, at a transmitter, a plurality of code blocks of a transmission for a receiver, transmitting the plurality of code blocks from the transmitter to the receiver in a time-frequency transmission stream according to a first code block transmission sequence of a plurality of code block transmission sequences, and re-transmitting, by the transmitter in response to the receiver failing to successfully receive the plurality of code blocks, the plurality of code blocks at a second code block transmission sequence of the plurality of code block transmission sequences, wherein the second code block transmission sequence is selected by the transmitter according to a number of times the receiver fails to successfully receive the plurality of code blocks.

In an additional aspect of the disclosure, a method of wireless communication including receiving, at a receiver, a time-frequency transmission stream from a transmitter, decoding, at the receiver, less than a plurality of code blocks of a transmission included in a first sequence in the time-frequency transmission stream, transmitting, by the receiver, a negative acknowledgement to the transmitter, in response to decoding less than the plurality of code blocks, and receiving, at the receiver, a retransmission of the time-frequency transmission stream from the transmitter including the plurality of code blocks, wherein the plurality of code blocks in the retransmission is arranged in a second sequence different than the first sequence.

In an additional aspect of the disclosure, a method of wireless communication including encoding, by a transmitter, a base constellation point in a fixed-size constellation using a first set of bits from one or more code blocks of a transmission for a receiver, encoding, by the transmitter, a refinement point in a second fixed-size constellation around the base constellation point using a second set of bits of the one or more code blocks, generating, by the transmitter, a modulated symbol based on one or more of the base constellation point and the refinement point, and transmitting at least the modulated symbol by the transmitter in a time-frequency transmission stream to the receiver.

In an additional aspect of the disclosure, a method of wireless communication includes receiving, at a receiver, a time-frequency transmission stream including at least one modulated symbols of a transmission from a transmitter, decoding, by the receiver using a fixed-size constellation, a base constellation point defined by a first set of bits of one or more code blocks, subtracting, by the receiver, the base constellation point from the at least one modulated symbols, decoding, by the receiver using a second fixed-size constellation around the base constellation point, a refinement point defined by a second set of bits of the one or more code blocks, and determining, by the receiver, a transmission based on one or more of the base constellation point and the refinement point.

In an additional aspect of the disclosure, an apparatus configured for wireless communication includes means for encoding, at a transmitter, a plurality of bits for one or more code blocks of a transmission, means for interleaving, by the transmitter, the plurality of bits of each of the one or more code blocks across two or more symbols in a time-frequency transmission stream, and means for transmitting, by the transmitter to a receiver, the time-frequency transmission stream.

In an additional aspect of the disclosure, an apparatus configured for wireless communication includes means for receiving, at a receiver, a time-frequency transmission stream from a transmitter, means for de-interleaving, by the receiver, a plurality of bits of each of one or more code blocks interleaved across two or more symbols in the time-frequency transmission stream, and means for decoding, at the receiver, the plurality of bits of the one or more code blocks into a transmission from the transmitter.

In an additional aspect of the disclosure, an apparatus configured for wireless communication includes means for encoding, at a transmitter, a plurality of code blocks of a transmission for a receiver, means for transmitting the plurality of code blocks from the transmitter to the receiver in a time-frequency transmission stream according to a first code block transmission sequence of a plurality of code block transmission sequences, and means for re-transmitting, by the transmitter in response to the receiver failing to successfully receive the plurality of code blocks, the plurality of code blocks at a second code block transmission sequence of the plurality of code block transmission sequences, wherein the second code block transmission sequence is selected by the transmitter according to a number of times the receiver fails to successfully receive the plurality of code blocks.

In an additional aspect of the disclosure, an apparatus configured for wireless communication including means for receiving, at a receiver, a time-frequency transmission stream from a transmitter, means for decoding, at the receiver, less than a plurality of code blocks of a transmission included in a first sequence in the time-frequency transmission stream, means for transmitting, by the receiver, a negative acknowledgement to the transmitter, in response to decoding less than the plurality of code blocks, and means for receiving, at the receiver, a retransmission of the time-frequency transmission stream from the transmitter including the plurality of code blocks, wherein the plurality of code blocks in the retransmission is arranged in a second sequence different than the first sequence.

In an additional aspect of the disclosure, an apparatus configured for wireless communication including means for encoding, by a transmitter, a base constellation point in a fixed-size constellation using a first set of bits from one or more code blocks of a transmission for a receiver, means for encoding, by the transmitter, a refinement point in a second fixed-size constellation around the base constellation point using a second set of bits of the one or more code blocks, means for generating, by the transmitter, a modulated symbol based on one or more of the base constellation point and the refinement point, and means for transmitting at least the modulated symbol by the transmitter in a time-frequency transmission stream to the receiver.

In an additional aspect of the disclosure, an apparatus configured for wireless communication includes means for receiving, at a receiver, a time-frequency transmission stream including at least one modulated symbols of a transmission from a transmitter, means for decoding, by the receiver using a fixed-size constellation, a base constellation point defined by a first set of bits of one or more code blocks, means for subtracting, by the receiver, the base constellation point from the at least one modulated symbols, means for decoding, by the receiver using a second fixed-size constellation around the base constellation point, a refinement point defined by a second set of bits of the one or more code blocks, and means for determining, by the receiver, a transmission based on one or more of the base constellation point and the refinement point.

In an additional aspect of the disclosure, a computer-readable medium having program code recorded thereon. This program code includes code to encode, at a transmitter, a plurality of bits for one or more code blocks of a transmission, code to interleave, by the transmitter, the plurality of bits of each of the one or more code blocks across two or more symbols in a time-frequency transmission stream, and code to transmit, by the transmitter to a receiver, the time-frequency transmission stream.

In an additional aspect of the disclosure, a computer-readable medium having program code recorded thereon. This program code includes code to receive, at a receiver, a time-frequency transmission stream from a transmitter, code to de-interleave, by the receiver, a plurality of bits of each of one or more code blocks interleaved across two or more symbols in the time-frequency transmission stream, and code to decode, at the receiver, the plurality of bits of the one or more code blocks into a transmission from the transmitter.

In an additional aspect of the disclosure, a computer-readable medium having program code recorded thereon. This program code includes code to encode, at a transmitter, a plurality of code blocks of a transmission for a receiver, code to transmit the plurality of code blocks from the transmitter to the receiver in a time-frequency transmission stream according to a first code block transmission sequence of a plurality of code block transmission sequences, and code to re-transmit, by the transmitter in response to the receiver failing to successfully receive the plurality of code blocks, the plurality of code blocks at a second code block transmission sequence of the plurality of code block transmission sequences, wherein the second code block transmission sequence is selected by the transmitter according to a number of times the receiver fails to successfully receive the plurality of code blocks.

In an additional aspect of the disclosure, a computer-readable medium having program code recorded thereon. This program code includes code to receive, at a receiver, a time-frequency transmission stream from a transmitter, code to decode, at the receiver, less than a plurality of code blocks of a transmission included in a first sequence in the time-frequency transmission stream, code to transmit, by the receiver, a negative acknowledgement to the transmitter, in response to decoding less than the plurality of code blocks, and code to receive, at the receiver, a retransmission of the time-frequency transmission stream from the transmitter including the plurality of code blocks, wherein the plurality of code blocks in the retransmission is arranged in a second sequence different than the first sequence.

In an additional aspect of the disclosure, a computer-readable medium having program code recorded thereon. This program code includes code to encode, by a transmitter, a base constellation point in a fixed-size constellation using a first set of bits from one or more code blocks of a transmission for a receiver, code to encode, by the transmitter, a refinement point in a second fixed-size constellation around the base constellation point using a second set of bits of the one or more code blocks, code to generate, by the transmitter, a modulated symbol based on one or more of the base constellation point and the refinement point, and code to transmit at least the modulated symbol by the transmitter in a time-frequency transmission stream to the receiver.

In an additional aspect of the disclosure, a computer-readable medium having program code recorded thereon. This program code includes code to receive, at a receiver, a time-frequency transmission stream including at least one modulated symbols of a transmission from a transmitter, code to decode, by the receiver using a fixed-size constellation, a base constellation point defined by a first set of bits of one or more code blocks, code to subtract, by the receiver, the base constellation point from the at least one modulated symbols, code to decode, by the receiver using a second fixed-size constellation around the base constellation point, a refinement point defined by a second set of bits of the one or more code blocks, and code to determine, by the receiver, a transmission based on one or more of the base constellation point and the refinement point.

In an additional aspect of the disclosure, an apparatus includes at least one processor and a memory coupled to the processor. The processor is configured to encode, at a transmitter, a plurality of bits for one or more code blocks of a transmission, to interleave, by the transmitter, the plurality of bits of each of the one or more code blocks across two or more symbols in a time-frequency transmission stream, and to transmit, by the transmitter to a receiver, the time-frequency transmission stream.

In an additional aspect of the disclosure, an apparatus includes at least one processor and a memory coupled to the processor. The processor is configured to receive, at a receiver, a time-frequency transmission stream from a transmitter, to de-interleave, by the receiver, a plurality of bits of each of one or more code blocks interleaved across two or more symbols in the time-frequency transmission stream, and to decode, at the receiver, the plurality of bits of the one or more code blocks into a transmission from the transmitter.

In an additional aspect of the disclosure, an apparatus includes at least one processor and a memory coupled to the processor. The processor is configured to encode, at a transmitter, a plurality of code blocks of a transmission for a receiver, to transmit the plurality of code blocks from the transmitter to the receiver in a time-frequency transmission stream according to a first code block transmission sequence of a plurality of code block transmission sequences, and to re-transmit, by the transmitter in response to the receiver failing to successfully receive the plurality of code blocks, the plurality of code blocks at a second code block transmission sequence of the plurality of code block transmission sequences, wherein the second code block transmission sequence is selected by the transmitter according to a number of times the receiver fails to successfully receive the plurality of code blocks.

In an additional aspect of the disclosure, an apparatus includes at least one processor and a memory coupled to the processor. The processor is configured to receive, at a receiver, a time-frequency transmission stream from a transmitter, to decode, at the receiver, less than a plurality of code blocks of a transmission included in a first sequence in the time-frequency transmission stream, to transmit, by the receiver, a negative acknowledgement to the transmitter, in response to decoding less than the plurality of code blocks, and to receive, at the receiver, a retransmission of the time-frequency transmission stream from the transmitter including the plurality of code blocks, wherein the plurality of code blocks in the retransmission is arranged in a second sequence different than the first sequence.

In an additional aspect of the disclosure, an apparatus includes at least one processor and a memory coupled to the processor. The processor is configured to encode, by a transmitter, a base constellation point in a fixed-size constellation using a first set of bits from one or more code blocks of a transmission for a receiver, to encode, by the transmitter, a refinement point in a second fixed-size constellation around the base constellation point using a second set of bits of the one or more code blocks, to generate, by the transmitter, a modulated symbol based on one or more of the base constellation point and the refinement point, and to transmit at least the modulated symbol by the transmitter in a time-frequency transmission stream to the receiver.

In an additional aspect of the disclosure, an apparatus includes at least one processor and a memory coupled to the processor. The processor is configured to receive, at a receiver, a time-frequency transmission stream including at least one modulated symbols of a transmission from a transmitter, to decode, by the receiver using a fixed-size constellation, a base constellation point defined by a first set of bits of one or more code blocks, to subtract, by the receiver, the base constellation point from the at least one modulated symbols, to decode, by the receiver using a second fixed-size constellation around the base constellation point, a refinement point defined by a second set of bits of the one or more code blocks, and to determine, by the receiver, a transmission based on one or more of the base constellation point and the refinement point.

BRIEF DESCRIPTION OF THE DRAWINGS

FIG. 5 is a diagram illustrating a time-frequency transmission subframe in an LTE/LTE-A communication system with unlicensed spectrum.

FIGS. 10A-10C are block diagrams illustrating a layered coding system using 4-QAM constellation in an LTE/LTE-A communication system with unlicensed spectrum configured according to one aspect of the present disclosure.

FIGS. 13A and 13B are block diagrams illustrating example blocks executed to implement one aspect of the present disclosure.

DETAILED DESCRIPTION

Figure 1:
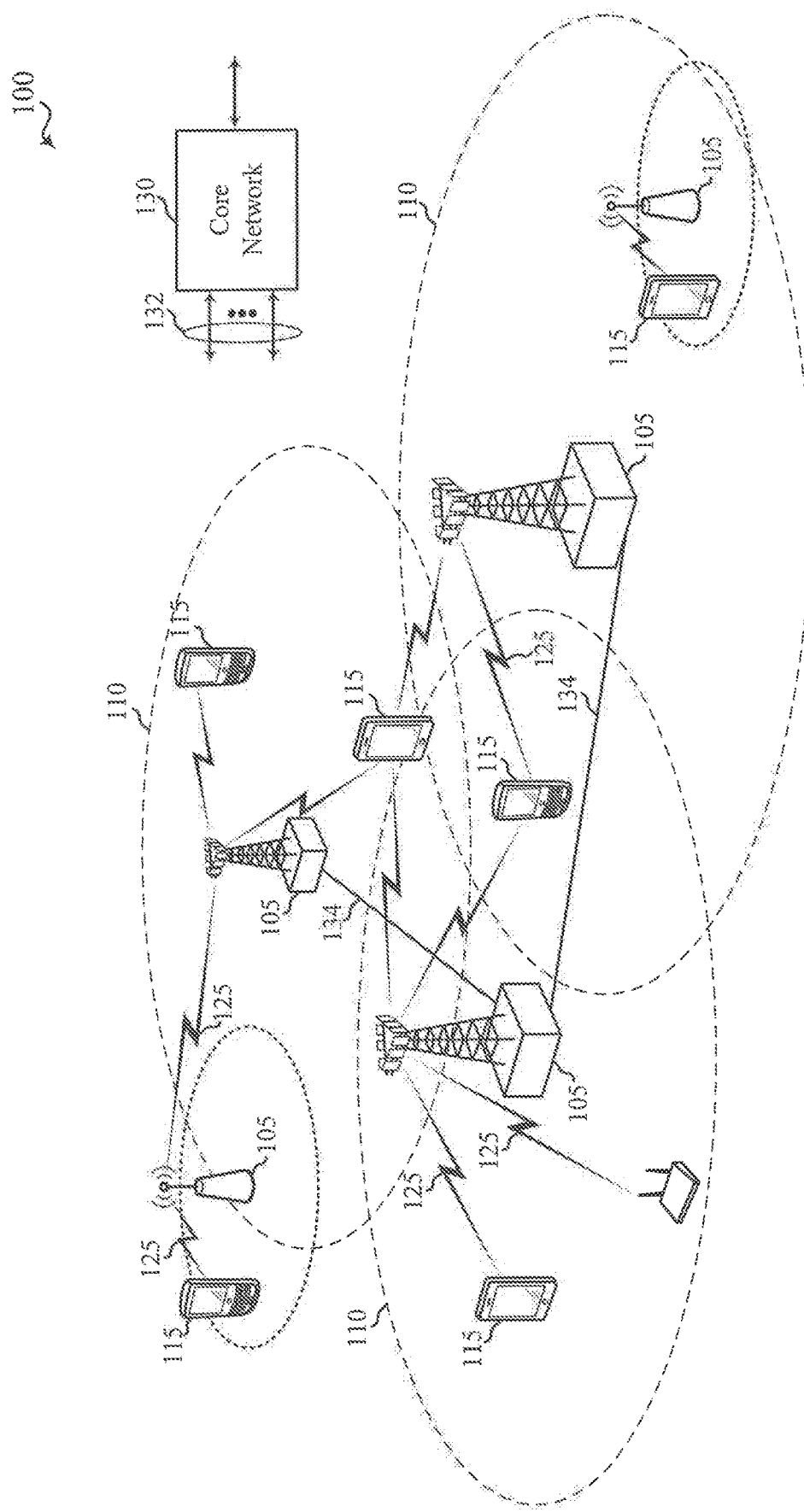
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Operators have so far looked at WiFi as the primary mechanism to use unlicensed spectrum to relieve ever increasing levels of congestion in cellular networks. However, a new carrier type (NCT) based on LTE in an unlicensed spectrum (LTE/LTE-A with unlicensed spectrum) may be compatible with carrier-grade WiFi, making LTE/LTE-A with unlicensed spectrum an alternative to WiFi. LTE/LTE-A with unlicensed spectrum may leverage LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some scenarios, LTE/LTE-A with unlicensed spectrum may perform significantly better than WiFi. For example, an all LTE/LTE-A deployment with unlicensed spectrum (for single or multiple operators) compared to an all WiFi deployment, or when there are dense small cell deployments, LTE/LTE-A with unlicensed spectrum may perform significantly better than WiFi. LTE/LTE-A with unlicensed spectrum may perform better than WiFi in other scenarios such as when LTE/LTE-A with unlicensed spectrum is mixed with WiFi (for single or multiple operators).

For a single service provider (SP), an LTE/LTE-A network with unlicensed spectrum on an unlicensed spectrum may be configured to be synchronous with a LTE network on the licensed spectrum. However, LTE/LTE-A networks with unlicensed spectrum deployed on a given channel by multiple SPs may be configured to be synchronous across the multiple SPs. One approach to incorporate both the above features may involve using a constant timing offset between LTE/LTE-A with and without unlicensed spectrum for a given SP. An LTE/LTE-A network with unlicensed spectrum may provide unicast and/or multicast services according to the needs of the SP. Moreover, an LTE/LTE-A network with unlicensed spectrum may operate in a bootstrapped mode in which LTE cells act as anchor and provide relevant cell information (e.g., radio frame timing, common channel configuration, system frame number or SFN, etc.). In this mode, there may be close interworking between LTE/LTE-A with and without unlicensed spectrum. For example, the bootstrapped mode may support the supplemental downlink and the carrier aggregation modes described above. The PHY-MAC layers of the LTE/LTE-A network with unlicensed spectrum may operate in a standalone mode in which the LTE/LTE-A network with unlicensed spectrum operates independently from an LTE network. In this case, there may be a loose interworking between LTE/LTE-A with and without unlicensed spectrum based on RLC-level aggregation with co-located cells, or multiflow across multiple cells and/or base stations, for example.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system or network 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In some embodiments, the system 100 is an LTE/LTE-A network that supports one or more LTE/LTE-A modes of operation or deployment scenarios with unlicensed spectrum. In other embodiments, the system 100 may support wireless communications using an unlicensed spectrum and an access technology different from LTE/LTE-A with unlicensed spectrum, or a licensed spectrum and an access technology different from LTE/LTE-A. The terms evolved Node B (eNB) and user equipment (UE) may be generally used to describe the base stations 105 and devices 115, respectively. The system 100 may be a Heterogeneous LTE/LTE-A network with or without unlicensed spectrum in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 are dispersed throughout the system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communications links 125 shown in system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The downlink transmissions may be made using a licensed spectrum (e.g., LTE), an unlicensed spectrum, or both. Similarly, the uplink transmissions may be made using a licensed spectrum (e.g., LTE), an unlicensed spectrum, or both.

In some embodiments of the system 100, various deployment scenarios for LTE/LTE-A with unlicensed spectrum may be supported including a supplemental downlink (SDL) mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations 105 as well as UEs 115 may support one or more of these or similar modes of operation. OFDMA communications signals may be used in the communications links 125 for LTE downlink transmissions in an unlicensed spectrum, while SC-FDMA communications signals may be used in the communications links 125 for LTE uplink transmissions in an unlicensed spectrum. Additional details regarding the implementation of LTE/LTE-A deployment scenarios or modes of operation with unlicensed spectrum in a system such as the system 100, as well as other features and functions related to the operation of LTE/LTE-A with unlicensed spectrum, are provided below with reference to FIGS. 2A-14B.

Figure 2A:
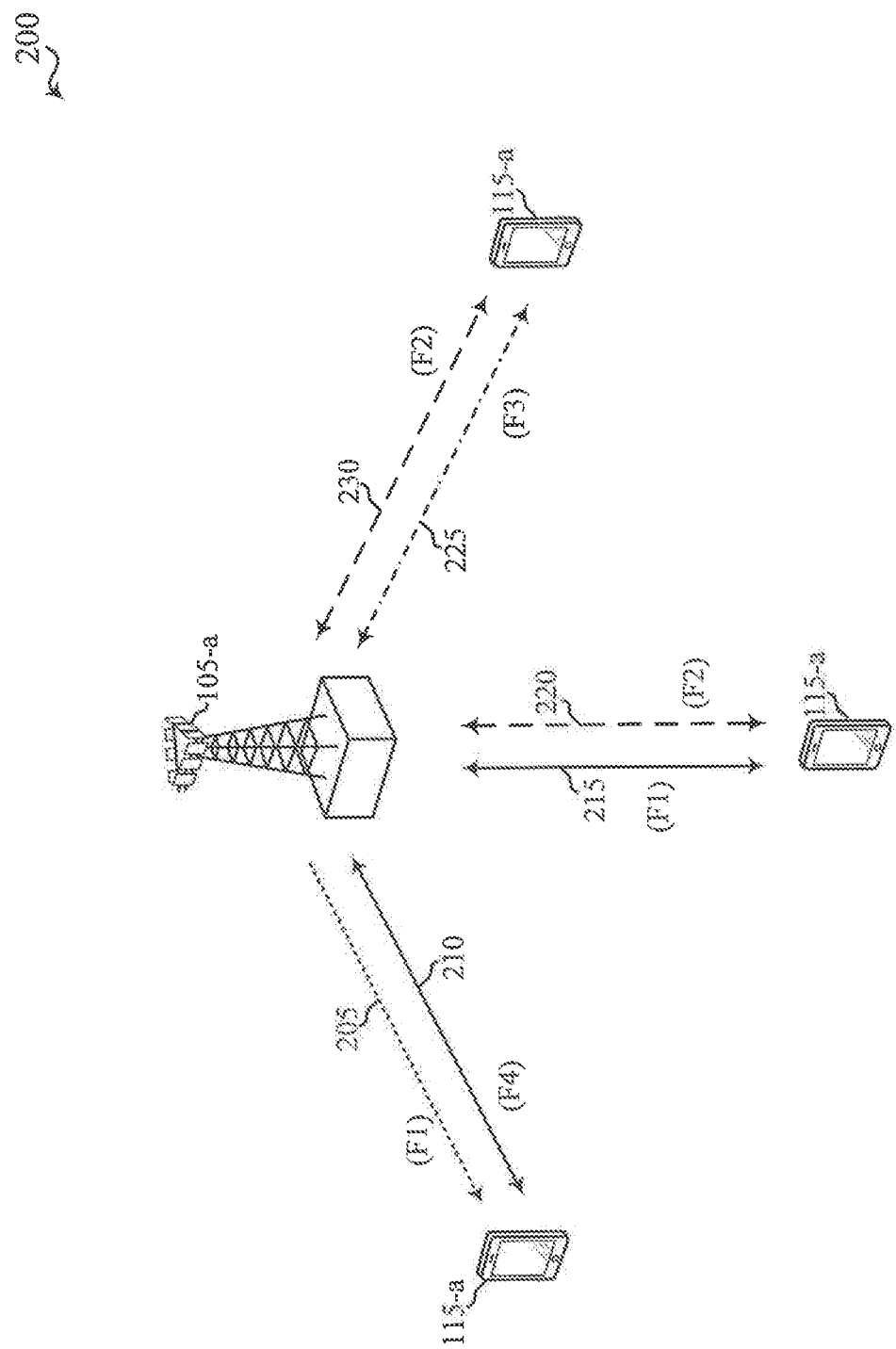
FIG. 2A shows a diagram that illustrates examples of deployment scenarios for using LTE in an unlicensed spectrum according to various embodiments.

Turning next to FIG. 2A, a diagram 200 shows examples of a supplemental downlink mode and of a carrier aggregation mode for an LTE network that supports communications over unlicensed spectrum. The diagram 200 may be an example of portions of the system 100 of FIG. 1. Moreover, the base station 105-*a* may be an example of the base stations 105 of FIG. 1, while the UEs 115-*a* may be examples of the UEs 115 of FIG. 1.

In the example of a supplemental downlink mode in diagram 200, the base station 105-*a* may transmit OFDMA communications signals to a UE 115-*a* using a downlink 205. The downlink 205 is associated with a frequency F1 in an unlicensed spectrum. The base station 105-*a* may transmit OFDMA communications signals to the same UE 115-*a* using a bidirectional link 210 and may receive SC-FDMA communications signals from that UE 115-*a* using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-*a*. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-*a* may transmit OFDMA communications signals to a UE 115-*a* using a bidirectional link 215 and may receive SC-FDMA communications signals from the same UE 115-*a* using the bidirectional link 215. The bidirectional link 215 is associated with the frequency F1 in the unlicensed spectrum. The base station 105-*a* may also transmit OFDMA communications signals to the same UE 115-*a* using a bidirectional link 220 and may receive SC-FDMA communications signals from the same UE 115-*a* using the bidirectional link 220. The bidirectional link 220 is associated with a frequency F2 in a licensed spectrum. The bidirectional link 215 may provide a downlink and uplink capacity offload for the base station 105-*a*. Like the supplemental downlink described above, this scenario may occur with any service provider (e.g., MNO) that uses a licensed spectrum and needs to relieve some of the traffic and/or signaling congestion.

In another example of a carrier aggregation mode in diagram 200, the base station 105-*a* may transmit OFDMA communications signals to a UE 115-*a* using a bidirectional link 225 and may receive SC-FDMA communications signals from the same UE 115-*a* using the bidirectional link 225. The bidirectional link 225 is associated with the frequency F3 in an unlicensed spectrum. The base station 105-*a* may also transmit OFDMA communications signals to the same UE 115-*a* using a bidirectional link 230 and may receive SC-FDMA communications signals from the same UE 115-*a* using the bidirectional link 230. The bidirectional link 230 is associated with the frequency F2 in the licensed spectrum. The bidirectional link 225 may provide a downlink and uplink capacity offload for the base station 105-*a*. This example and those provided above are presented for illustrative purposes and there may be other similar modes of operation or deployment scenarios that combine LTE/LTE-A with and without unlicensed spectrum for capacity offload.

As described above, the typical service provider that may benefit from the capacity offload offered by using LTE/LTE-A in an unlicensed band is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the secondary component carrier (SCC) on the unlicensed spectrum.

In the supplemental downlink mode, control for LTE/LTE-A with unlicensed spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in the unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated over unlicensed spectrum (e.g., bidirectional links 215 and 225). The carrier aggregation mechanisms supported when using LTE/LTE-A with unlicensed spectrum may fall under a hybrid frequency division duplexing-time division duplexing (FDD-TDD) carrier aggregation or a TDD-TDD carrier aggregation with different symmetry across component carriers.

Figure 2B:
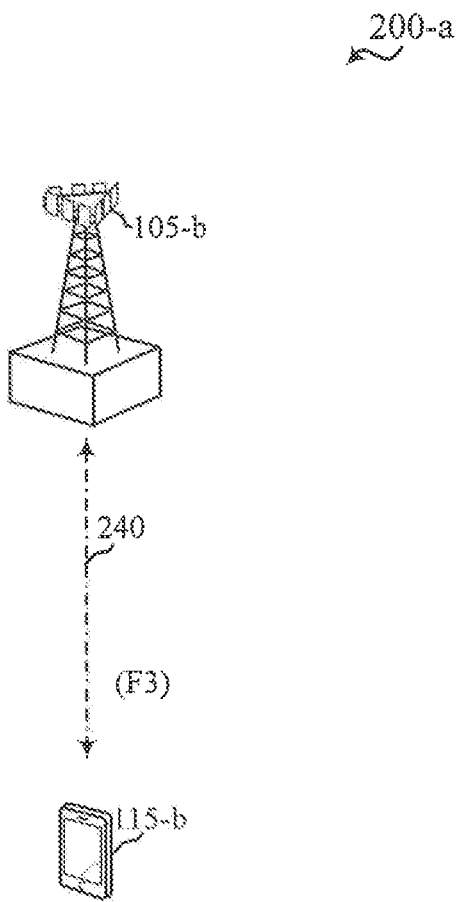
FIG. 2B shows a diagram that illustrates another example of a deployment scenario for using LTE in an unlicensed spectrum according to various embodiments.

FIG. 2B shows a diagram 200-*a* that illustrates an example of a standalone mode for LTE/LTE-A with unlicensed spectrum. The diagram 200-*a* may be an example of portions of the system 100 of FIG. 1. Moreover, the base station 105-*b* may be an example of the base stations 105 of FIG. 1 and the base station 105-*a* of FIG. 2A, while the UE 115-*b* may be an example of the UEs 115 of FIG. 1 and the UEs 115-*a* of FIG. 2A.

In the example of a standalone mode in diagram 200-*a*, the base station 105-*b* may transmit OFDMA communications signals to the UE 115-*b* using a bidirectional link 240 and may receive SC-FDMA communications signals from the UE 115-*b* using the bidirectional link 240. The bidirectional link 240 is associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event hosts, hotels, enterprises, and large corporations that do not have licensed spectrum. For these service providers, an operational configuration for the standalone mode may use the PCC on the unlicensed spectrum. Moreover, LBT may be implemented on both the base station and the UE.

Figure 3:
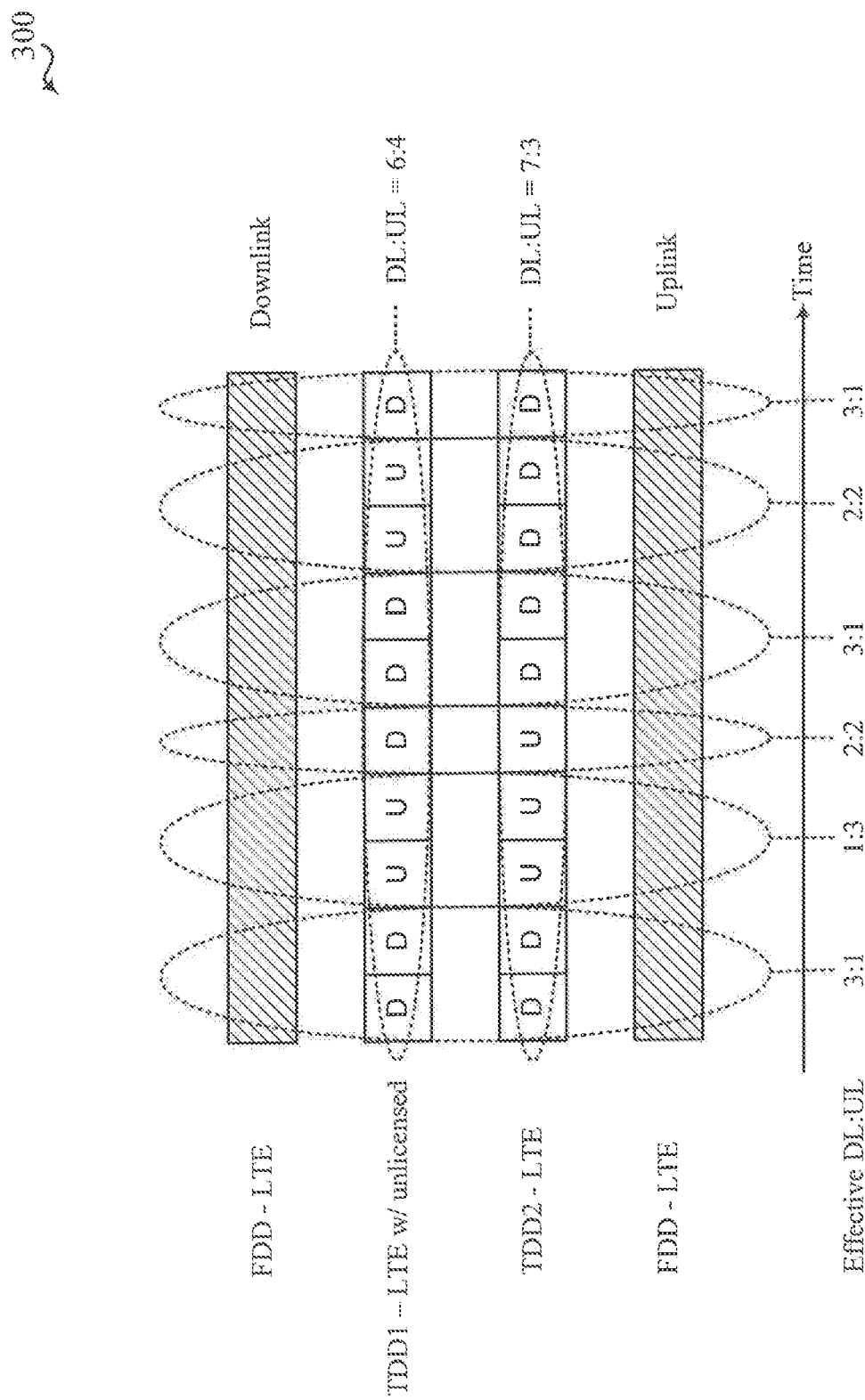
FIG. 3 shows a diagram that illustrates an example of carrier aggregation when using LTE concurrently in licensed and unlicensed spectrum according to various embodiments.

Turning next to FIG. 3, a diagram 300 illustrates an example of carrier aggregation when using LTE concurrently in licensed and unlicensed spectrum according to various embodiments. The carrier aggregation scheme in diagram 300 may correspond to the hybrid FDD-TDD carrier aggregation described above with reference to FIG. 2A. This type of carrier aggregation may be used in at least portions of the system 100 of FIG. 1. Moreover, this type of carrier aggregation may be used in the base stations 105 and 105-*a* of FIG. 1 and FIG. 2A, respectively, and/or in the UEs 115 and 115-*a* of FIG. 1 and FIG. 2A, respectively.

In this example, an FDD (FDD-LTE) may be performed in connection with LTE in the downlink, a first TDD (TDD1) may be performed in connection with LTE/LTE-A with unlicensed spectrum, a second TDD (TDD2) may be performed in connection with LTE, and another FDD (FDD- LTE) may be performed in connection with LTE in the uplink. TDD1 results in a DL:UL ratio of 6:4, while the ratio for TDD2 is 7:3. On the time scale, the different effective DL:UL ratios are 3:1, 1:3, 2:2, 3:1, 2:2, and 3:1. This example is presented for illustrative purposes and there may be other carrier aggregation schemes that combine the operations of LTE/LTE-A with and without unlicensed spectrum.

Figure 4:
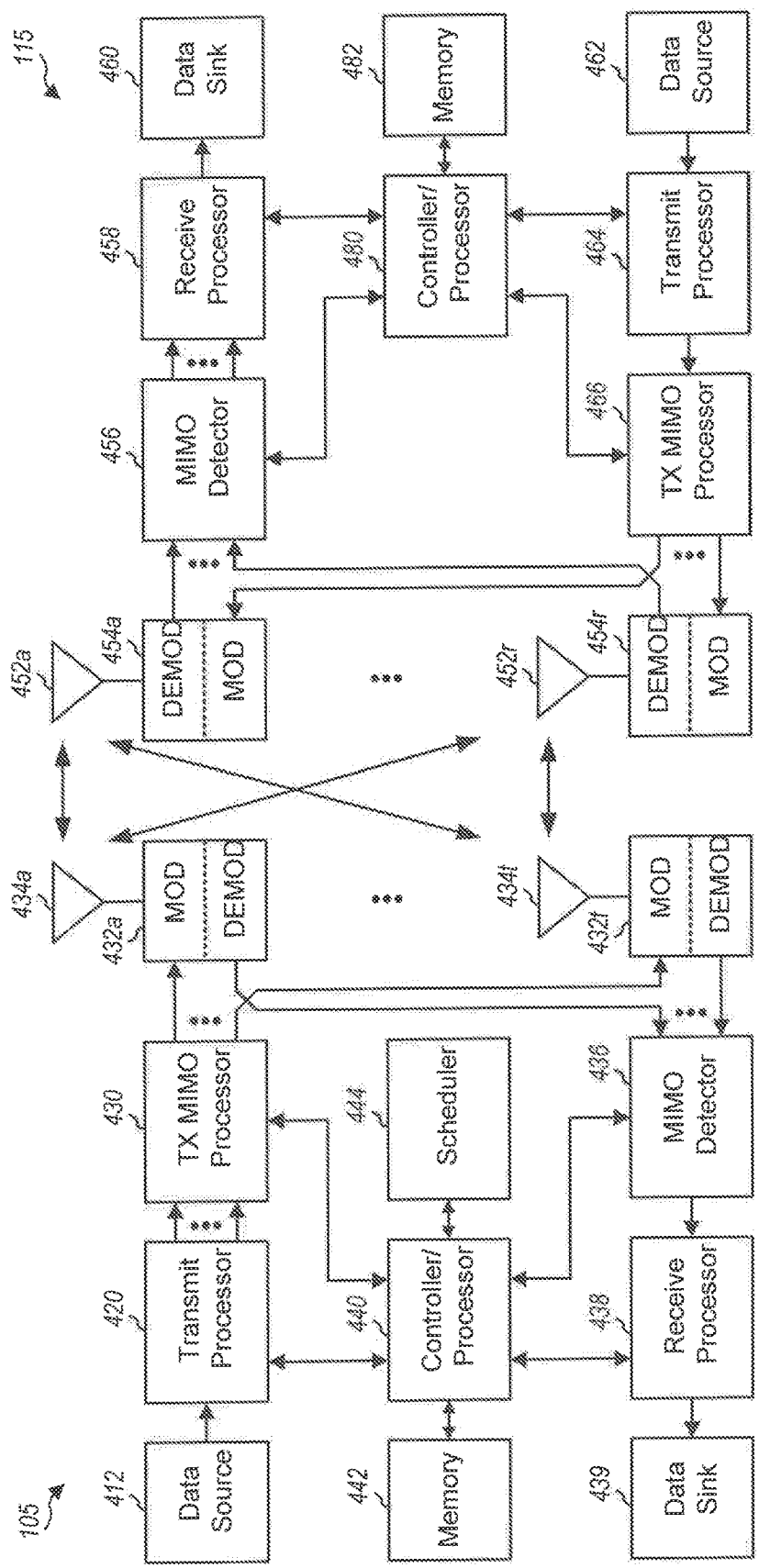
FIG. 4 is a block diagram conceptually illustrating a design of a base station/eNB and a UE configured according to one aspect of the present disclosure.

FIG. 4 shows a block diagram of a design of a base station/eNB 105 and a UE 115, which may be one of the base stations/eNBs and one of the UEs in FIG. 1. The eNB 105 may be equipped with antennas 434a through 434t, and the UE 115 may be equipped with antennas 452a through 452r. At the eNB 105, a transmit processor 420 may receive data from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. A transmit (TX) multiple-input multiple-output (MIMO) processor 430 may perform spatial processing (e.g., preceding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 115, the antennas 452a through 452r may receive the downlink signals from the eNB 105 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 115 to a data sink 460, and provide decoded control information to a controller/processor 480.

On the uplink, at the UE 115, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNB 105. At the eNB 105, the uplink signals from the UE 115 may be received by the antennas 434, processed by the modulators 432, detected by a MIMO detector 436 if applicable, and further processed by a receive processor 438 to obtain decoded data and control information sent by the UE 115. The processor 438 may provide the decoded data to a data sink 439 and the decoded control information to the controller/processor 440.

The controllers/processors 440 and 480 may direct the operation at the eNB 105 and the UE 115, respectively. The controller/processor 440 and/or other processors and modules at the eNB 105 may perform or direct the execution of various processes for the techniques described herein. The controllers/processor 480 and/or other processors and modules at the UE 115 may also perform or direct the execution of the functional blocks illustrated in FIGS. 12A-14B, and/or other processes for the techniques described herein. The memories 442 and 482 may store data and program codes for the eNB 105 and the UE 115, respectively. A scheduler 444 may schedule UEs for data transmission on the downlink and/or uplink.

With the implementation of wireless technologies for communication using LTE/LTE-A with unlicensed spectrum, various adaptations may be desirable in order to accommodate LTE operations over an unlicensed band with efficiency and a little change from the current LTE standards as possible. For example, various resource mapping procedures may be adapted for LTE operations with unlicensed spectrum in LTE/LTE-A deployments.

Communications in LTE/LTE-A deployments with unlicensed spectrum may experience significant bursty interference because of different types of signals transmitted in unlicensed bands. For example, scheduled communication may experience bursty interference from different signals, such as acknowledgement (ACK) signals. Control and management packets in unlicensed spectrum are very short duration packets (e.g., 50-100 µs), generally making up less than 10% of subframe duration. Additionally, scheduled communications may experience interference from uplink UE transmissions when one operator deploys SDL and another operator deploys carrier aggregation (CA) or stand-alone (SA) LTE/LTE-A deployments with unlicensed spectrum on the same channel.

In standard LTE operations, each transport block (TB) of a transmission is typically divided into several code blocks (CBs) and each CB is turbo coded and interleaved separately. A CB may be between 40 and 6,144 bits in length. A 20 MHz LTE transmission may include up to 13 CBs in each TB. The coded TB is re-assembled from the output of the encoding and the bits are then modulated into symbols using various modulation schemes, such as quadrature phase-shift keying (QPSK), 16-quadrature amplitude modulation (16-QAM), 64-quadrature amplitude modulation (64-QAM), and the like. In LTE systems, the modulated symbols are arranged sequentially first in frequency on each orthogonal frequency division multiplexing (OFDM) symbol and then in time over several OFDM symbols constituting a subframe in a time-frequency transmission stream. FIG. 5 is a diagram illustrating a time-frequency transmission subframe 50 in an LTE/LTE-A communication system with unlicensed spectrum. The modulated symbols based on the code block bits are arranged according to sequence 500 of time-frequency transmission subframe 50. Sequence 500 illustrates the CB modulated symbols placed sequentially first in the frequencies over a single OFDM symbol and then in time over different OFDM symbols. In a worst case, there may be 13 CBs in on TB, where each CB spans one OFDM symbol. In average scenarios, however, each TB may include 5-6 CBs, with each CB spanning 2-3 OFDM symbols.

An ACK bit is sent by the receiver if a TB is correctly decoded, and a TB may only be considered correctly decoded if all the constituent CBs are correctly decoded. The unlicensed signal 501 causes interference for a short duration, but may affect transmissions in one or more OFDM symbols over each of the frequencies for that symbol. Thus, because the CB modulated symbols are placed consecutively in frequency over a single symbol before being placed in time across symbols in an LTE/LTE-A deployment with unlicensed spectrum, a short unlicensed spectrum packet, such as unlicensed packet 501, may cause at least one of the CBs to be decoded incorrectly resulting in the retransmission of the entire TB.

In order to reduce re-transmissions due to interference from short bursty unlicensed spectrum signals, various aspects of the present disclosure provide for the modulated symbols based on the bits from each CB to be distributed over a larger portion of the time-frequency transmission grid. With the symbols from each such CB spread over a wider part of the time-frequency transmission stream, the transmitted CBs may only be partially affected but with enough redundancy to be successfully decoded by a receiver.

Figures 6, 7:
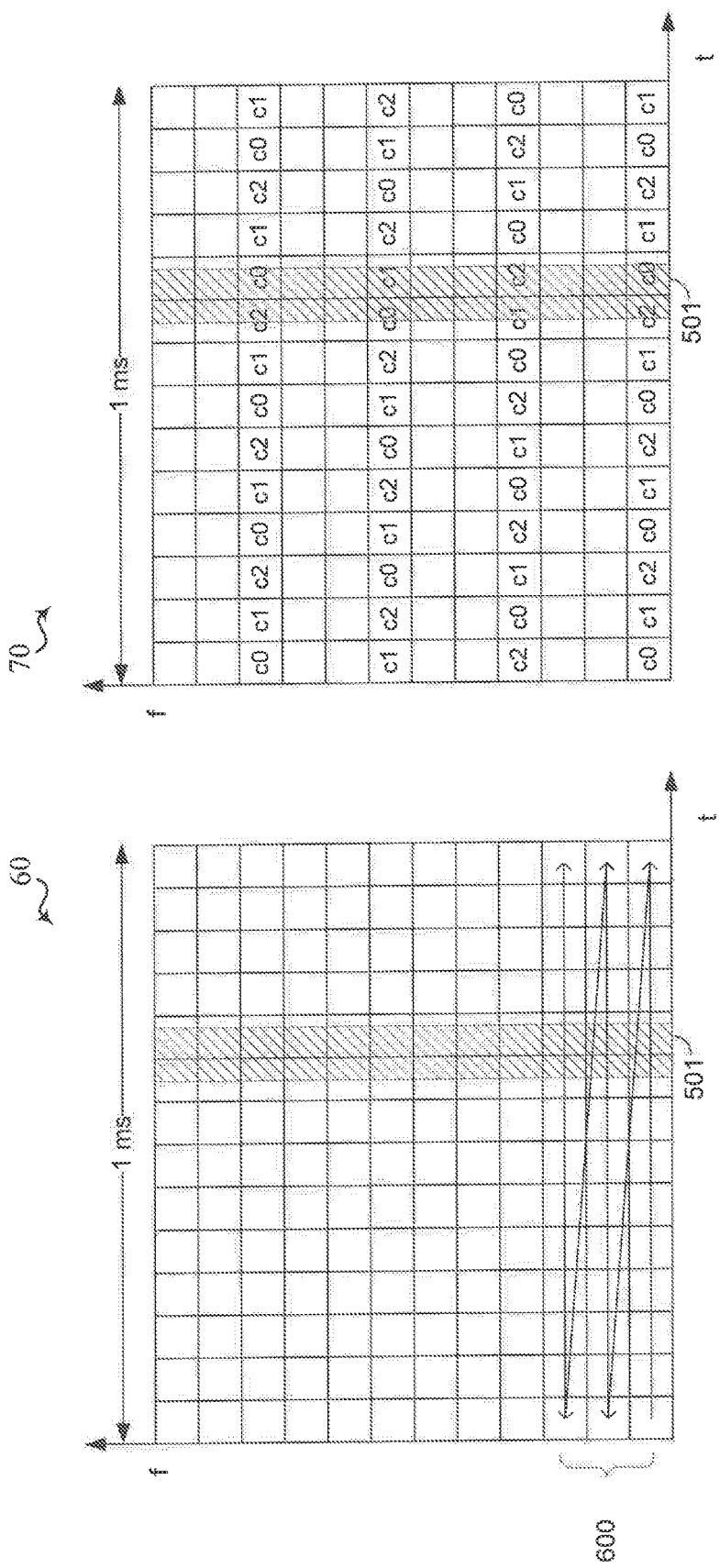
FIG. 6 is a diagram illustrating a time-frequency transmission subframe having CBs spread according to one aspect of the present disclosure.
FIG. 7 is a diagram illustrating a time-frequency transmission subframe having CBs spread according to one aspect of the present disclosure.

FIG. 6 is a diagram illustrating a time-frequency transmission subframe 60 having CBs spread according to one aspect of the present disclosure. Instead of being spread over frequency first and then time, as illustrated in time-frequency transmission subframe 50 (FIG. 5) and used in LTE downlink transmissions, the aspect of the present disclosure illustrated in FIG. 6 spreads the symbols of a code block in sequence 600, spreading the symbols across multiple OFDM symbols in time first and then over the frequencies of the same OFDM symbols. Therefore, when unlicensed packet 501 interferes with symbols of the code block spread with sequence 600, it may only impact a portion of a modulated symbol, leaving enough redundancy to allow decoding of the CB. The spreading with sequence 600 spreads out CBs in time and reduces the impact due to very short bursts, such as ACK, RTS/CTS packets, and the like. Time first, frequency second (as in today's LTE UL). This spreads out CBs in time and reduces impact due to very short bursts such as ACK, RTS/CTS packets.

FIG. 7 is a diagram illustrating a time-frequency transmission subframe 70 having CBs spread according to one aspect of the present disclosure. The spreading sequence illustrated in FIG. 7 provides for a two-dimensional (2D) interleaving of symbols based on multiple CBs across the entire subframe of time-frequency transmission subframe 70. Modulated symbols for multiple CBs are interleaved using both time and frequency, but are not placed sequentially. By using this 2D interleaving, the aspect illustrated in FIG. 7 thoroughly mixes the data from several CBs across the entire time-frequency transmission subframe 70. Thus, when unlicensed packet 501 interferes with the modulated symbols interleaved in two-dimensions in time-frequency transmission subframe 70, even fewer symbols from the same CB may be interfered with, allowing for the receiver to successfully decode the CBs.

Figure 8:
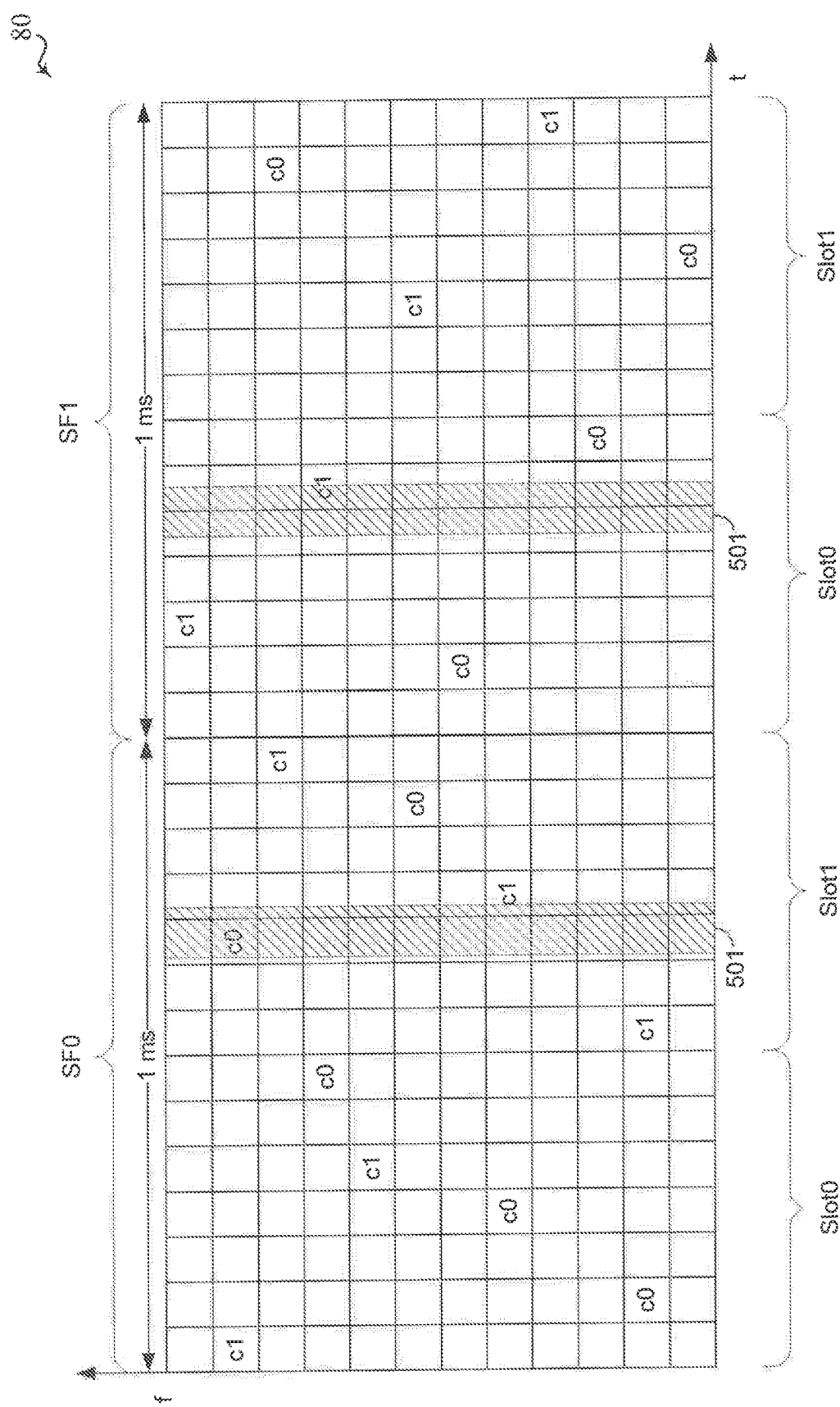
FIG. 8 is a diagram illustrating time-frequency transmissions stream configured according to one aspect of the present disclosure.

FIG. 8 is a diagram illustrating time-frequency transmissions stream 80 configured according to one aspect of the present disclosure. The spreading sequence illustrated in FIG. 8 provides for modulated symbols for multiple code blocks interlaced across subframes of time-frequency transmissions stream 80. Subframe 0, SF0, and Subframe 1, SF1, include modulated symbols based on code block 0, c0, and code block 1, c1, that have been interlaced in two-dimensions across SF0 and SF1. Unlicensed packet 501 provides interference with SF0 in slot 1 and SF1 in slot 0. With the modulated symbols interleaved not only in two-dimensions within each subframe, but also across subframes, any code block based symbols that may be impacted by interference from unlicensed packet 501, would be minimized with sufficient redundancy provided for across SF0 and SF1 to allow for a receiver to successfully decode the interleaved modulated code block symbols.

Figure 9:
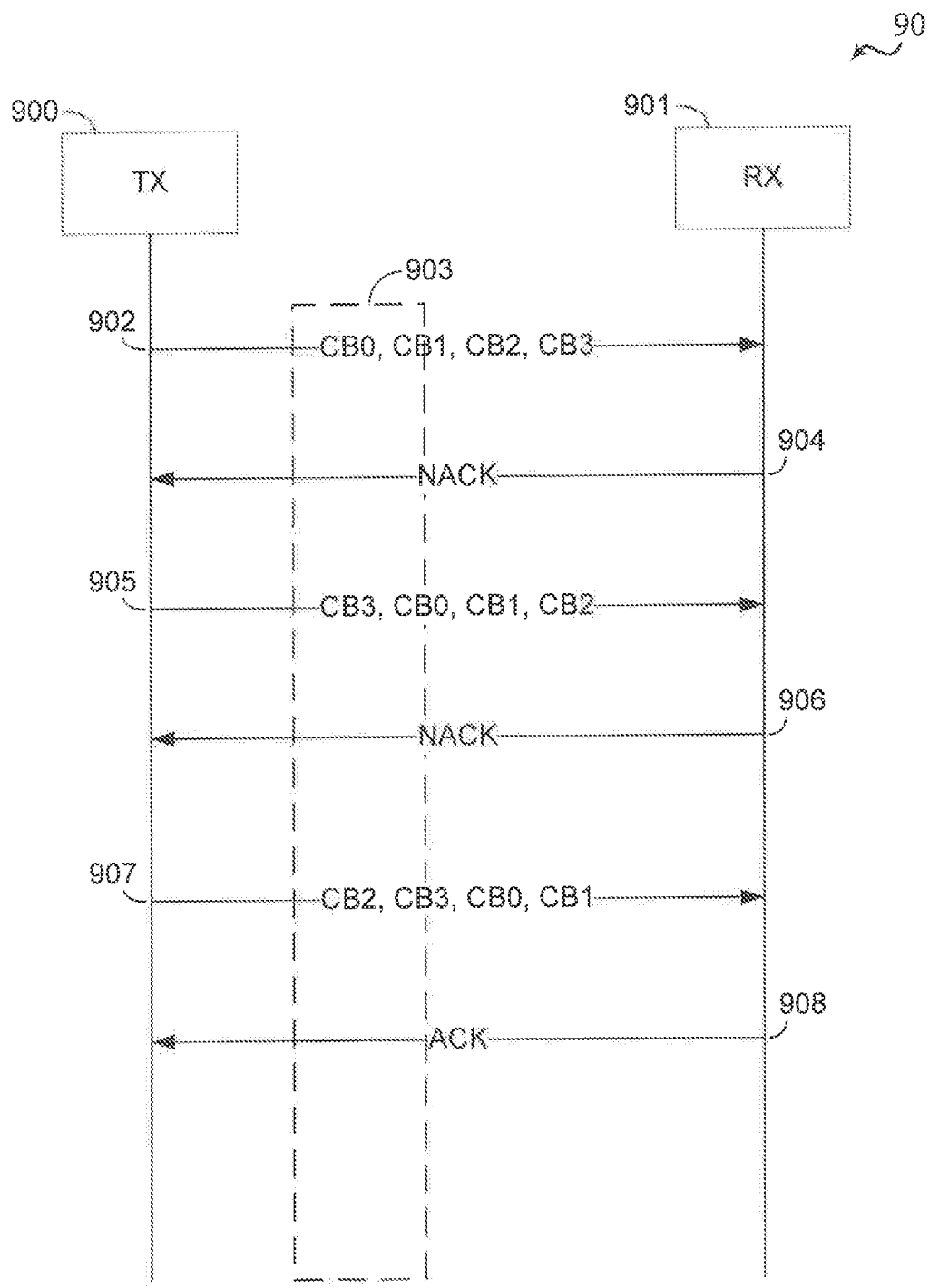
FIG. 9 is a call flow diagram illustrating communication between a transmitter and a receiver configured according to one aspect of the present disclosure.

Additional aspects of the present disclosure may reduce interference-based re-transmissions by providing for code block-level re-mapping for re-transmissions. FIG. 9 is a call flow diagram 90 illustrating communication between a transmitter 900 and a receiver 901 configured according to one aspect of the present disclosure. Transmitter 900 may be a transmitter for a UE sending a transmission to a base station or eNB as receiver 901. In other aspects, a base station or eNB may operate as transmitter 900 sending transmissions for a UE or mobile device operating as receiver 901. At time 902, transmitter 900 sends code blocks, CB0, CB1, CB2, and CB3 to receiver 901. An unlicensed spectrum bursty transmission 903 provides interference to the transmission, which causes receiver 901 to transmit NACK signal at time 904. In response to the NACK, transmitter 900 selects to re-transmit code blocks CB0, CB1, CB2, and CB3 to receiver 901. However, according to the aspect illustrated in FIG. 9, transmitter 900 selects a new code block transmission configuration, which remaps the order of the transmitted code blocks. Thus, at time 905, transmitter 900 re-transmits the code blocks at the selected code block transmission configuration, transmitting in the order CB3, CB0, CB1, and CB2. Interference from unlicensed spectrum bursty transmission 903 again causes enough interference for receiver 901 to fail to successfully receive each of the code blocks. However, before transmitting another NACK, receiver 901 identifies whether the code blocks that were successfully received with the transmission at time 902 plus the code block successfully received at time 905 constitute all of the transmitted code blocks. Because, receiver 901 has not yet received CB0 successfully, NACK is transmitted at time 906. In response to receiving the NACK, transmitter 900 again selects a new code block transmission configuration. The specific remapping configuration sequence is selected by transmitter 900 as a function of the RV (redundancy version). If quick feedback is available, for example, via a WIFI link on another channel, then the transmitter may exploit interference diversity across re-transmissions.

At time 907, transmitter 900 re-transmits the code blocks according to the new selected remapping. Unlicensed spectrum bursty transmission 903 still interferes with the code block transmission at time 907. However, receiver has now successfully received all of the code blocks even though it was not able to successfully receive all of the code blocks in any single transmission from transmitter 900. Accordingly, at time 908, receiver 901 transmits an ACK message to transmitter 900.

It should be noted that the re-mapping of code block re-transmissions, as illustrated in FIG. 9 and described herein, may also be used in conjunction with the various interleaving techniques described with respect to FIGS. 6-8. In transmitting the code blocks according to the different re-transmission configurations may be coded into the transmission by interleaving the modulated symbols consecutively in time over multiple OFDM symbols and then over frequency in a transmission subframe, as illustrated in and described with respect FIG. 6. The modulated symbols of the re-transmitted code blocks may also be coded into the transmission using 2D interleaving across the entire subframe in time and frequency, as illustrated in and described with respect to FIG. 7. Alternatively, the modulated symbols of the re-transmitted code blocks may be coded into the transmission by interleaving across multiple subframes of the transmission stream. The various aspects of the present disclosure may use any variety of interleaving with such code block re-transmission re-mapping.

Figure 10C:
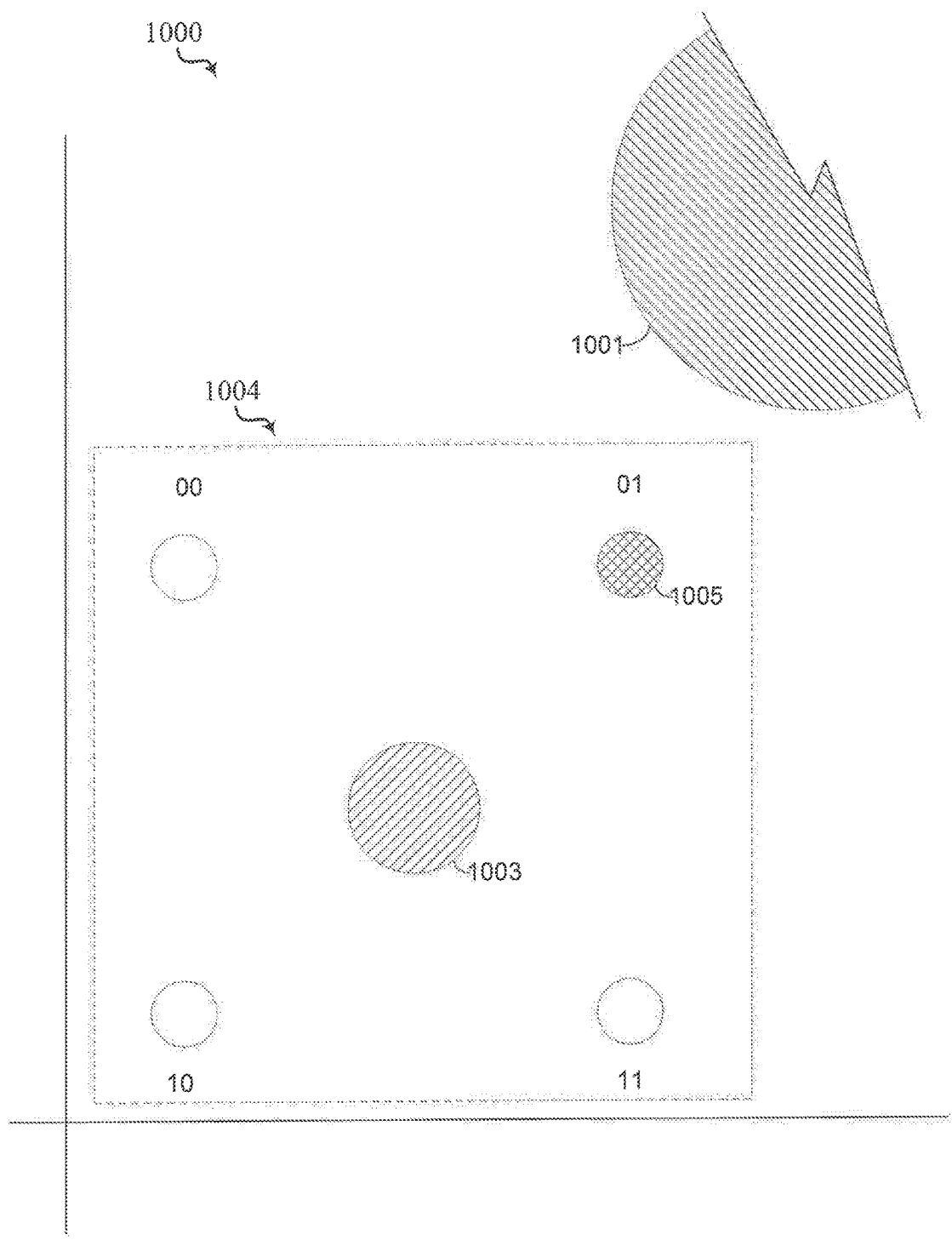

Various aspects of the present disclosure also provide for layered coding and decoding which may increase the efficiency of decoding or canceling interference from neighboring cells. In a layered coding configuration, a higher level modulation, such as 16-QAM, 64-QAM, and the like may be generated by successively refining constellation point selections of a fixed, lower-level modulation, such as 4-QAM. FIGS. 10A-10C are block diagrams illustrating a layered coding system using 4-QAM constellation 1000 in an LTE/LTE-A communication system with unlicensed spectrum configured according to one aspect of the present disclosure. At the transmitter side, which may be an eNB preparing a transmission for a UE or may be a UE preparing a transmission for an eNB, a first set of bits is used in FIG. 10A to select a point in 4-QAM constellation 1000. For example, 2-bits from a first code block, CB0, may be used to select the '01' constellation point, base constellation point 1001.

In FIG. 10B, after selecting base constellation point 1001, the transmitter uses a second set of bits from a second code block to select a refinement constellation point, refinement point 1003, in a second 4-QAM constellation 1002 around base constellation point 1001. For example, 2-bits from a second code block, CB1, may be used to select the '10' constellation point of second 4-QAM constellation 1002 as refinement point 1003. The use of the second set of bits from CB1 refines the first 4-QAM selection into a level equivalent to a 16-QAM modulation level, thus, increasing the granularity of the modulation even though only 4-QAM constellations are being used.

In FIG. 10C, the encoding transmitter has refined the modulation point to a 16-QAM level using two layered 4-QAM constellation selections with bits from multiple code blocks. For an LTE/LTE-A communication system with unlicensed spectrum that operates with 16-QAM modulation, the coding process would stop here for this symbol of the transmission. In additional aspects, for system deployments or equipment that use 64-QAM modulation, the encoding transmitter would use a third set of bits from another code block to select a further refining constellation point using a third 4-QAM constellation 1004. For example, the encoding transmitter would use 2-bits from a third code block, CB2, to select the '01' constellation point of third 4-QAM constellation 1004 for a second refinement point 1005. The use of the third set of bits from CB2 further refines the layered 16-QAM constellation point into a layered 64-QAM constellation point.

In the decoding process, the decoding receiver may now always assume the use of a fixed-size constellation that may be a lower modulation level considering the refinement gained through the layering. Instead of decoding from the further refined point, the various aspects of the present disclosure provide for the receiver to treat the refinements as noise and decode the base constellation point, such as base constellation point 1001 first. Referring to FIG. 10C, the decoding receiver uses 4-QAM constellation 1000 to decode base constellation point 1001 defined by the bits from CB0. The refinements from the CB1 and CB2 code blocks are treated as noise. Once base constellation point 1001 is decoded, the decoding receiver subtracts the signal corresponding to CB0 from the received signal.

After subtracting the decoded signal, the remaining receive signal again, looks like a 4-QAM constellation. The decoding receiver then decodes refinement point 1003 defined by the bits of CB1. The decoded signal from CB1 is then subtracted from the remaining received signal. The remaining received signal, again, appears as a 4-QAM constellation. The decoding receiver will then decode second refinement point 1005 defined by the bits of CB2. With all of the bits of CB0-CB2 recovered, the decoding receiver may assemble the transport block (TB) for obtaining the received transmission data.

As indicated by the decoding process, at each layer of decoding, the decoding receiver sees less interference as the decoded signals are subtracted from the received signal one-by-one. As such, in the various aspects of layered decoding configured according to the present disclosure, the coding rate used in decoding each layer is different. For example, initially decoding base constellation point 1001 is decoding the bits of CB0 from the received signal with the highest amount of interference experienced. Accordingly, the coding rate used for decoding base constellation point 1001 is a lower coding rate. At each successive layer of decoding, with the decreasing interference, the decoding receiver may use a higher and higher decoding rate. This will ensure that base constellation point 1001 is accurately decoded first, while being more efficient in decoding the successive refinement points that experience less interference.

Figure 11:
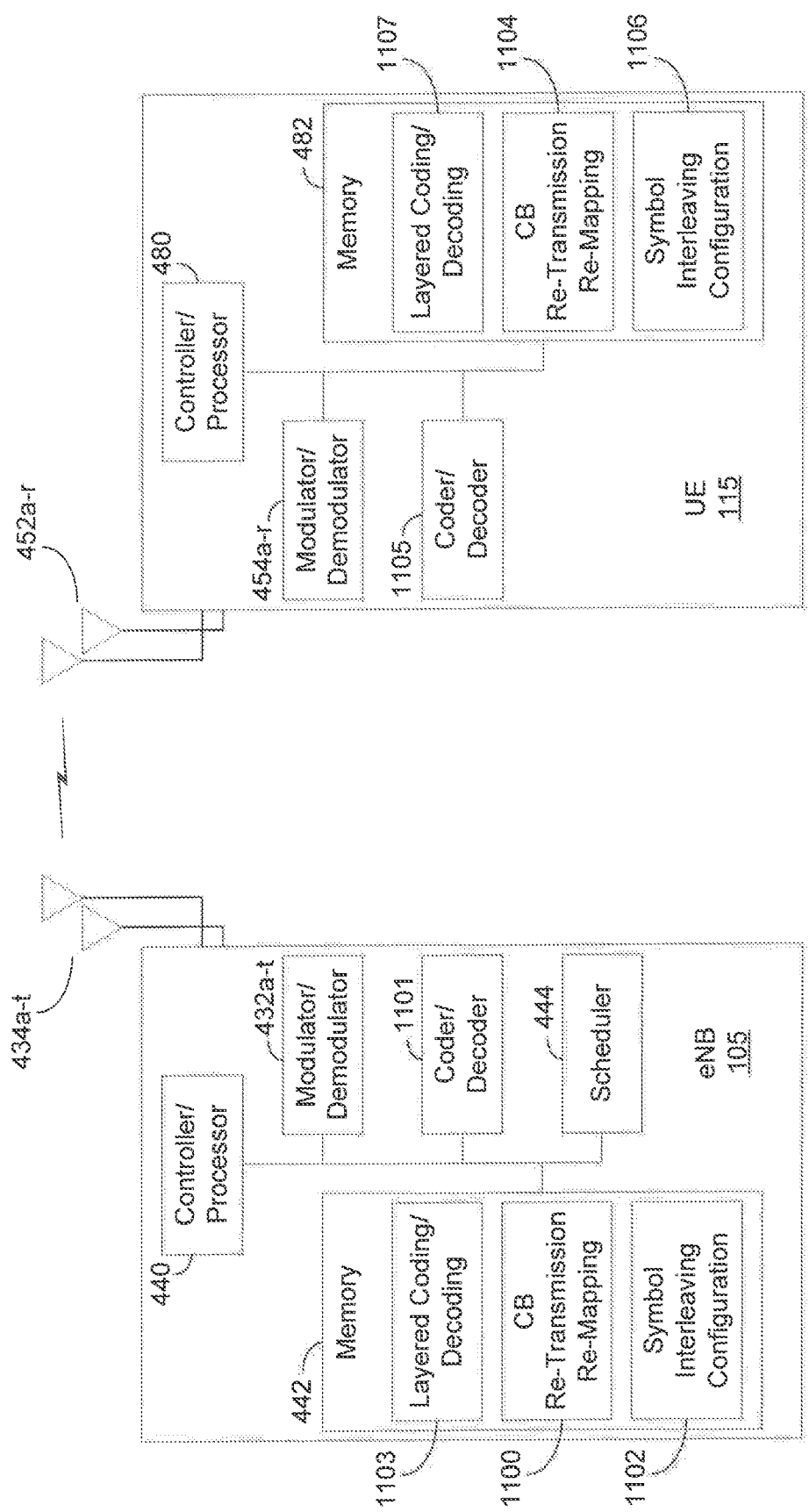
FIG. 11 is a block diagram illustrating an eNB and UE in an LTE/LTE-A communication system with unlicensed spectrum configured according to one aspect of the present disclosure.

FIG. 11 is a block diagram illustrating eNB 105 and UE 115 in an LTE/LTE-A communication system with unlicensed spectrum configured according to one aspect of the present disclosure. The illustrated hardware and software of eNB 105 and UE 115 provide the means for implementing the various aspects and implementations of the present disclosure. Under control of controller/processor 440, eNB 105 may send and receive transmissions through time-frequency transmission streams sent and received over antennas 434a-t. UE 115, under control of controller/processor 480, may also receive and send transmissions through time-frequency transmission streams sent and received over antennas 452a-r.

In one example aspect, when bursty unlicensed transmissions interference with UE 115 successfully receiving the code blocks in a transmission from eNB 105, eNB 105 may use the code block re-transmission re-mapping, through execution of CB re-transmission re-mapping logic 1100, stored in memory 442. Based on the number of re-transmissions requested by UE 115, eNB 105, under control of controller/processor 440, selects one of the different re-mapping sequences maintained by CB re-transmission re-mapping logic 1100, which, using scheduler 444, coder/decoder 1101, and modulator/demodulators 432a-t, re-transmits the code blocks over antennas 434a-t to UE 115.

In alternative aspects, eNB 105 may transmit and re-transmit the code block transmissions using one of the interleaving schemes illustrated in FIGS. 6-8. Execution by controller/processor 440 of symbol interleaving configuration 1102, stored in memory 442, provide the particular interleaving scheme for interleaving the modulated symbols of the code blocks over more of the transmission symbols or subframes, as illustrated in FIGS. 6-8.

In the various aspects, when preparing the transmission for UE 115, eNB 105, under control of controller/processor 440, executes layered coding/decoding logic 1103, stored in memory 442, to drive coder/decoder 1101 in the layered coding of the transmission. Executing layered coding/decoding logic 1103 controls coder/decoder 1101 in performing the layered encoding described with respect to FIGS. 10A-10C. Using a fixed-size constellation, eNB 105 uses bits from multiple code blocks to select a base constellation point and further refinement points for the encoded symbol for transmission.

As UE 115 receives the signal from eNB 105 over antennas 452*a-r*, controller/processor 480 executes layered coding/decoding logic 1107, in memory 482, to control coder/decoder 1105 to perform the reverse layered decoding by first decoding the base constellation point at a lower coding rate, subtracting the decoded signal from the received signal, and then decoding the successive refinement constellation points at higher coding rates because of the decreasing interference seen with each successive decoded signal being subtracted from the received signal. After all of the bits from each of the code blocks that define the base constellation point and refinement points at the layered fixed-size constellation, UE 115 may assemble the transport block with the data received from eNB 105.

UE 115 may also act as the transmitter, encoding data and transmissions for eNB 105, which would then act as the receiver, decoding the transmissions from UE 115. UE 115 also includes the symbol interleaving configuration 1106 and CB re-transmission re-mapping logic 1104, in memory 482, that allows UE 115, under control of controller/processor 480 to perform the encoding transmitter functions as described herein.

Figures 12A, 12B:
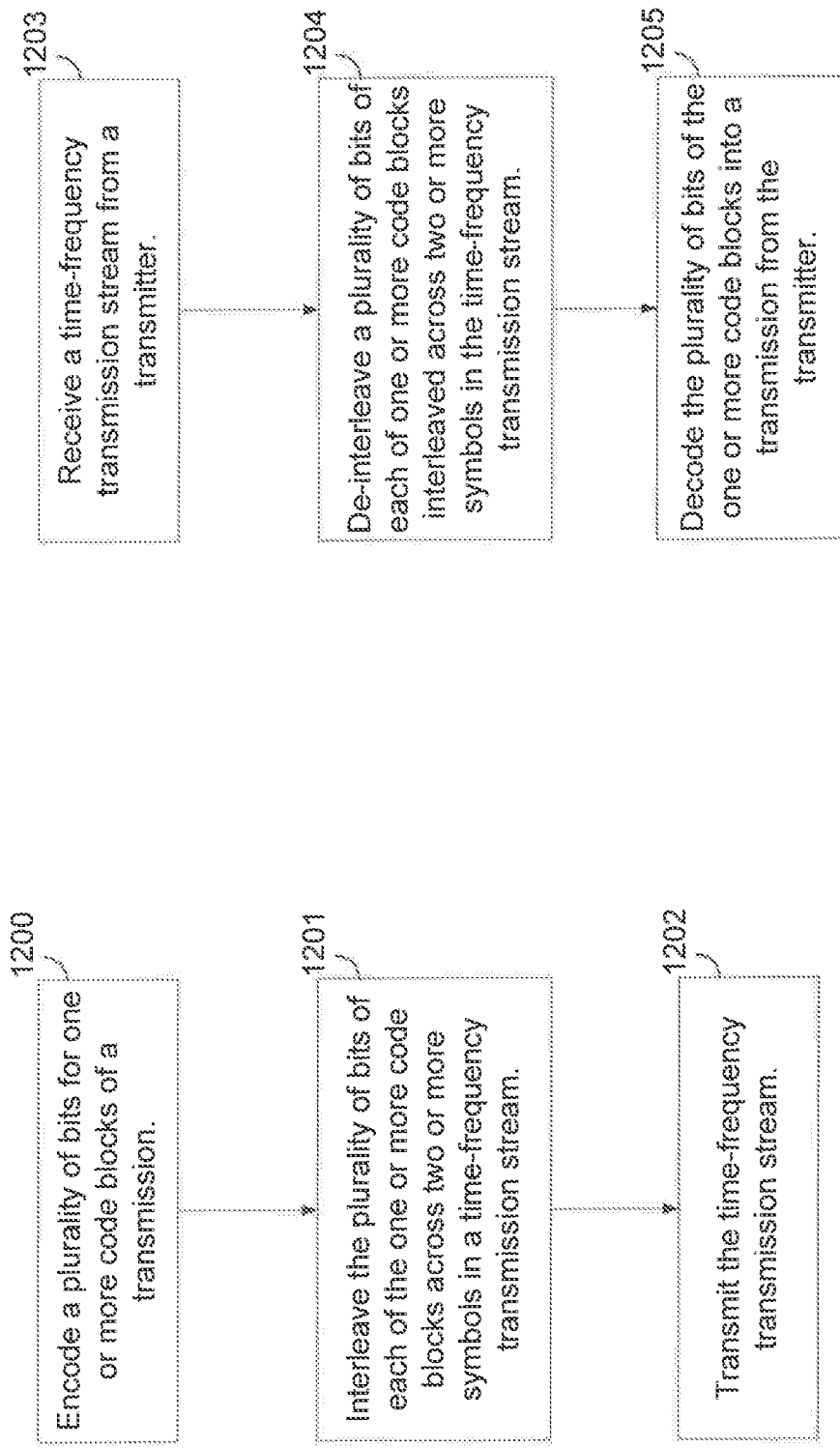
FIGS. 12A and 12B are block diagrams illustrating example blocks executed to implement one aspect of the present disclosure.

FIGS. 12A and 12B are block diagrams illustrating example blocks executed to implement one aspect of the present disclosure. At block 1200, an encoding transmitter encodes a plurality of bits for one or more code blocks for a transmission. The encoding transmitter is preparing to send information in the transmission to a receiver. At block 1201, the encoding transmitter interleaves the plurality of bits of each of the one or more code blocks across two or more symbols in a time-frequency transmission stream. The resulting interleaved structure provides for the bits of each code block to be spread over more of the symbols or subframes of the transmission stream. At block 1202, the encoding transmitter transmits the time-frequency transmission stream to the receiver.

At the receiver end, at block 1203, the decoding receiver receives the time-frequency transmission stream from the transmitter. The decoding receiver then de-interleaves, at block 1204, the plurality of bits of each of the one or more code blocks that have been interleaved over the transmission stream. At block 1205, the decoding receiver decodes the bits of the one or more code blocks into the transmission of the information from the transmitter. After decoding the code blocks, the receiver assembles the transport blocks for obtaining the information in the transmission.

FIGS. 13A and 13B are block diagrams illustrating example blocks executed to implement one aspect of the present disclosure. At block 1300, an encoding transmitter encodes a plurality of code words for a transmission of data or information to a receiver. At block 1301, the transmitter transmits the plurality of code blocks in a time-frequency transmission stream according to a first code block transmission sequence of many different sequences. At the receiver side, at block 1303, the decoding receiver receives the time-frequency transmission stream from the transmitter. However, at block 1304, the receiver fails to decode all of the code blocks that were included in the transmission. In response to the failure to successfully decode all of the code blocks, at block 1305, the receiver transmits a NACK to the transmitter.

When the transmitter receives the NACK, indicating that the receiver has failed to successfully decode all of the code blocks, the transmitter, at block 1302, re-transmits the code blocks using a second code block transmission sequence that it selects according to the number of re-transmissions that have been required. The transmitter specifically selects the sequence based on how many times the transmitter has had to re-transmit the code blocks. At the receiver, at block 1306, the retransmitted transmission signal is received including the code blocks arranged according to the different sequence. If unlicensed burst interference causes the receiver to fail to successfully receive all of the code blocks again, then the receiver may check to see whether, including the code blocks that had previously been successfully received, it has now received all of the code blocks from the transmission through combining. If the receiver has, through combination of previously unsuccessful reception of code blocks, now received all of the intended code blocks, it may send an ACK to the transmitter. However, if the receiver has still not received all of the intended code blocks, another NACK will be sent, causing the transmitter to re-transmit the code blocks again using a different re-mapping sequence of code blocks.

Figures 14A, 14B:
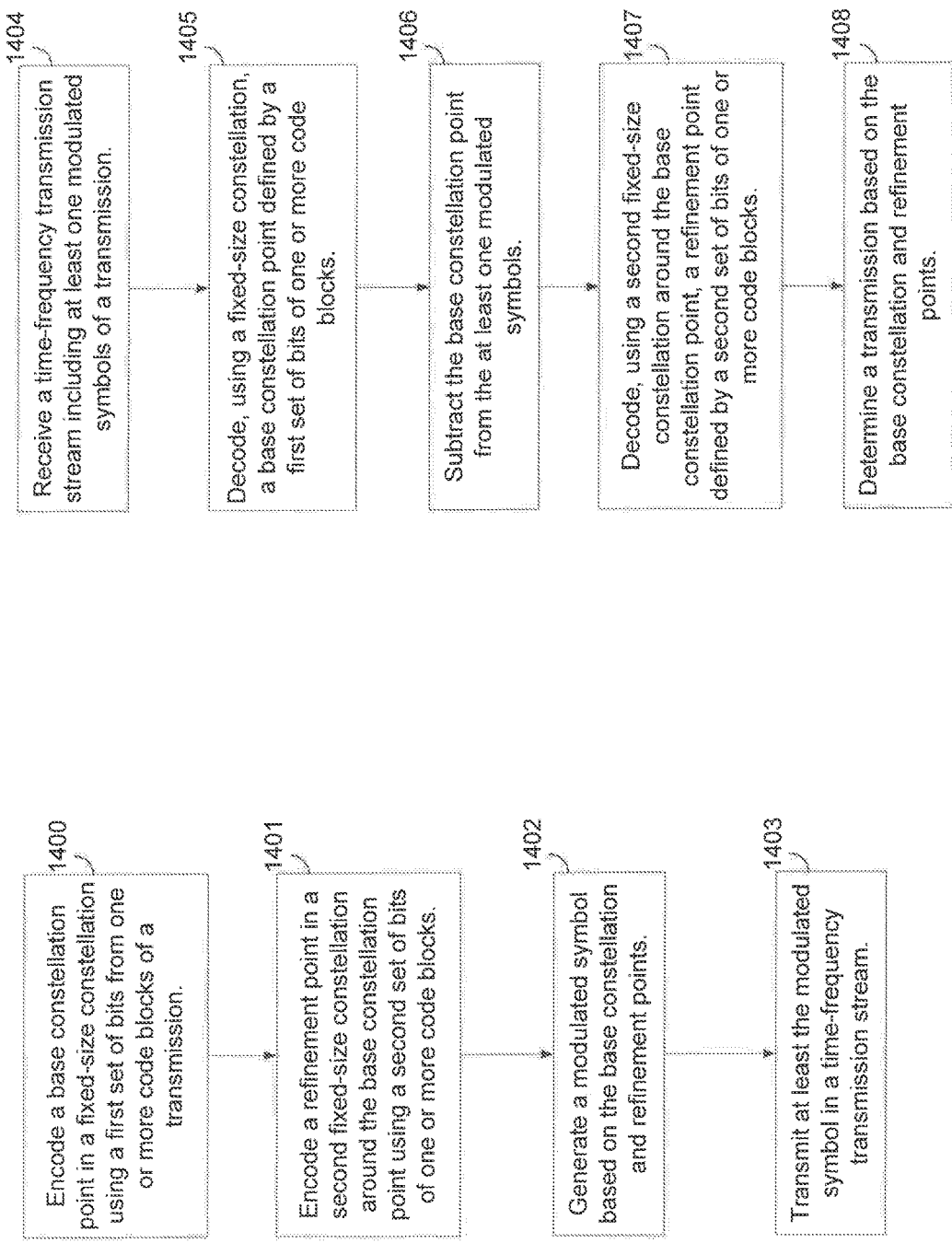
FIGS. 14A and 14B are block diagrams illustrating example blocks executed to implement one aspect of the present disclosure.

FIGS. 14A and 14B are block diagrams illustrating example blocks executed to implement one aspect of the present disclosure. At block 1400, an encoding transmitter begins the encoding process by encoding a base constellation point in a fixed-size constellation using a first set of bits from one or more code blocks of a transmission. At block 1401, the transmitter encodes a refinement point in a second fixed-size constellation around the base constellation point using a second set of bits from one or more code blocks for the transmission. At block 1402, the transmitter generates a modulated symbol using the base constellation and refinement points and then transmits, at block 1403, at least the modulated symbol in a time-frequency transmission stream.

On the decoding receiver side, at block 1404, the receiver receives the time-frequency transmission stream including at least the modulated symbol. The receiver begins the decoding process by decoding the base constellation point, at block 1405, using the fixed-size constellation to obtain the first set of bits of the corresponding code block. At block 1406, the receiver subtracts the base constellation point from the remaining received signal including the modulated symbols. The receiver then decodes, at block 1407, the refinement point using the second fixed-size constellation around the base constellation point in order to obtain the second set of bits of the corresponding code block for the refinement point. At block 1408, the receiver, using the recovered sets of bits from decoding the base constellation and refinement point, assembles the decoded code blocks into the transport block to determine the transmission. As each successive decoding will see less interference, because of subtracting the decoded signal from the remaining received signal, a different coding rate may be used by the receiver for each successive decoding process. To enable this feature, the encoding transmitter would encode, depending on the order, each successive constellation point or refinement at a different coding rate. Thus, the encoding and decoding may be performed at different coding rates depending on the encoding/decoding layer.

The various aspects of the present disclosure increase the robustness and resistance to short bursty interference by distributing bits from a given code block over a larger part of the time-frequency grid. The various aspects of the present disclosure that provide layered decoding may also allow for more efficient cancelation of interference from other eNBs. One of the challenges in cancelling interference from other eNBs is to determine the constellation used in the interfering signal. With the proposed layered coding scheme, the receiver may always assume that interferer is coded from a fixed-size constellation, and decode its base constellation point first. Canceling the base fixed-size constellation signal removes interference partially from the other eNB. Next, the receiver may estimate and cancel the refinements to the interference constellation if more interference energy is detected. Thus, layered decoding may also help to improve interference cancellation from other eNBs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 12A-14B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
encoding, at a transmitter, a plurality of bits for two or more code blocks of a transmission;
interleaving, by the transmitter, the plurality of bits of each of the two or more code blocks across two or more symbols in a time-frequency transmission stream;
transmitting, by the transmitter to a receiver, the time-frequency transmission stream, wherein the time-frequency transmission stream is transmitted according to a first code block transmission sequence of a plurality of code block transmission sequences; and
re-transmitting, by the transmitter in response to a receiver failing to successfully receive the time-frequency transmission stream, the time-frequency transmission stream at a second code block transmission sequence of the plurality of code block transmission sequences, wherein the second code block transmission sequence provides code-block-level re-mapping of the two or more code blocks and is selected by the transmitter according to a number of times the receiver fails to successfully receive the time-frequency transmission stream.

2. The method of claim 1, wherein the interleaving includes:
sequentially arranging the plurality of bits of each of the one or more code blocks in time from a first symbol of a plurality of symbols at a first frequency of a subframe of the time-frequency transmission stream to a last symbol of the plurality of symbols at the first frequency;
sequentially arranging remaining bits of the plurality of bits for each of the one or more code blocks in time from the first symbol of the plurality of symbols at a next frequency of the subframe to the last symbol of the plurality of symbols at the next frequency of the subframe; and
continuing the sequentially arranging from the first symbol to the last symbol of the plurality of symbols for each of the plurality of frequencies of the subframe until all of the plurality of bits have been arranged.

3. The method of claim 1, wherein the interleaving includes:
interleaving the plurality of bits of each of the one or more code blocks in time and frequency across a plurality of symbols of a subframe of the time-frequency transmission stream, wherein the plurality of bits of each one of the one or more code blocks is arranged across the two or more symbols of the plurality of symbols of the subframe and across two or more frequencies of a plurality of frequencies of the subframe.

4. The method of claim 1, wherein the interleaving includes:
interleaving the plurality of bits of each of the one or more code blocks across two or more subframes of the time-frequency transmission stream.

5. The method of claim 1, wherein each code block of the two or more code blocks has a minimum length of forty bits.

6. A method of wireless communication, comprising:
receiving, at a receiver, a time-frequency transmission stream from a transmitter;
de-interleaving, by the receiver, a plurality of bits of each of two or more code blocks interleaved across two or more symbols in the time-frequency transmission stream;
decoding, at the receiver, the plurality of bits of the two or more code blocks into a transmission from the transmitter,
decoding, at the receiver, less than a plurality of code blocks of a transmission included in a first sequence in the time-frequency transmission stream;
transmitting, by the receiver, a negative acknowledgement to the transmitter, in response to decoding less than the plurality of code blocks; and
receiving, at the receiver, a retransmission of the time-frequency transmission stream from the transmitter including the plurality of code blocks, wherein the plurality of code blocks in the retransmission is arranged in a second sequence different than the first sequence, and the second transmission sequence provides code-block-level re-mapping of the two or more code blocks.

7. The method of claim 6, wherein the de-interleaving includes:
sequentially selecting the plurality of bits of each of the one or more code blocks in time from a first symbol of a plurality of symbols at a first frequency of a subframe of the time-frequency transmission stream to a last symbol of the plurality of symbols at the first frequency;
sequentially selecting remaining bits of the plurality of bits for each of the one or more code blocks in time from the first symbol of the plurality of symbols at a next frequency of the subframe to the last symbol of the plurality of symbols at the next frequency of the subframe; and
continuing the sequentially selecting from the first symbol to the last symbol of the plurality of symbols for each of the plurality of frequencies of the subframe until all of the plurality of bits have been selected.

8. The method of claim 6, wherein the de-interleaving includes:
de-interleaving the plurality of bits of each of the one or more code blocks in time and frequency across a plurality of symbols of a subframe of the time-frequency transmission stream, wherein the plurality of bits of each one of the one or more code blocks is selected from across the two or more symbols of the plurality of symbols of the subframe and from across two or more frequencies of a plurality of frequencies of the subframe.

9. The method of claim 6, wherein each code block of the two or more code blocks has a minimum length of forty bits.

10. The method of claim 6, further including:
decoding, at the receiver, less than the plurality of code blocks included in the retransmission;
transmitting, by the receiver, another negative acknowledgement to the transmitter, in response to decoding less than the plurality of code blocks in the retransmission and when one or more of the plurality of code blocks decoded in the transmission and one or more of the plurality of code blocks decoded in the retransmission are less than the plurality of code blocks.

11. An apparatus configured for wireless communication, the apparatus comprising:
at least one processor; and
a memory coupled to the at least one processor,
wherein the at least one processor is configured:
to encode, at a transmitter, a plurality of bits for two or more code blocks of a transmission;

to interleave, by the transmitter, the plurality of bits of each of the two or more code blocks across two or more symbols in a time-frequency transmission stream;

to transmit, by the transmitter to a receiver, the time-frequency transmission stream, wherein the time-frequency transmission stream is transmitted according to a first code block transmission sequence of a plurality of code block transmission sequences; and to re-transmit, by the transmitter in response to a receiver failing to successfully receive the time-frequency transmission stream, the time-frequency transmission stream at a second code block transmission sequence of the plurality of code block transmission sequences, wherein the second code block transmission sequence provides code-block-level re-mapping of the two or more code blocks and is selected by the transmitter according to a number of times the receiver fails to successfully receive the time-frequency transmission stream.

12. The apparatus of claim 11, wherein the configuration of the at least one processor to interleave includes configuration of the at least one processor:

to sequentially arrange the plurality of bits of each of the one or more code blocks in time from a first symbol of a plurality of symbols at a first frequency of a subframe of the time-frequency transmission stream to a last symbol of the plurality of symbols at the first frequency;

to sequentially arrange remaining bits of the plurality of bits for each of the one or more code blocks in time from the first symbol of the plurality of symbols at a next frequency of the subframe to the last symbol of the plurality of symbols at the next frequency of the subframe; and to continue the configuration to sequentially arrange from the first symbol to the last symbol of the plurality of symbols for each of the plurality of frequencies of the subframe until all of the plurality of bits have been arranged.

13. The apparatus of claim 11, wherein the configuration of the at least one processor interleave includes configuration to interleave the plurality of bits of each of the one or more code blocks in time and frequency across a plurality of symbols of a subframe of the time-frequency transmission stream, wherein the plurality of bits of each one of the one or more code blocks is arranged across the two or more symbols of the plurality of symbols of the subframe and across two or more frequencies of a plurality of frequencies of the subframe.

14. The apparatus of claim 11, wherein the configuration of the at least one processor to interleave includes configuration to interleave the plurality of bits of each of the one or more code blocks across two or more subframes of the time-frequency transmission stream.

15. The apparatus of claim 11, wherein each code block of the two or more code blocks has a minimum length of forty bits.

16. A non-transitory computer-readable medium having program code recorded thereon, the program code comprising:

program code for causing a computer to encode, at a transmitter, a plurality of bits for two or more code blocks of a transmission;

program code for causing the computer to interleave, by the transmitter, the plurality of bits of each of the two or more code blocks across two or more symbols in a time-frequency transmission stream;

program code for causing the computer to transmit, by the transmitter to a receiver, the time-frequency transmission stream, wherein the time-frequency transmission stream is transmitted according to a first code block transmission sequence of a plurality of code block transmission sequences; and program code for causing the computer to re-transmit, by the transmitter in response to a receiver failing to successfully receive the time-frequency transmission stream, the time-frequency transmission stream at a second code block transmission sequence of the plurality of code block transmission sequences, wherein the second code block transmission sequence provides code-block-level re-mapping of the two or more code blocks and is selected by the transmitter according to a number of times the receiver fails to successfully receive the time-frequency transmission stream.

17. The non-transitory computer-readable medium of claim 16, wherein the program code for causing the computer to interleave includes:

program code for causing the computer to sequentially arrange the plurality of bits of each of the one or more code blocks in time from a first symbol of a plurality of symbols at a first frequency of a subframe of the time-frequency transmission stream to a last symbol of the plurality of symbols at the first frequency;

program code for causing the computer to sequentially arrange remaining bits of the plurality of bits for each of the one or more code blocks in time from the first symbol of the plurality of symbols at a next frequency of the subframe to the last symbol of the plurality of symbols at the next frequency of the subframe; and program code for causing the computer to continue executing the program code for causing the computer to sequentially arrange from the first symbol to the last symbol of the plurality of symbols for each of the plurality of frequencies of the subframe until all of the plurality of bits have been arranged.

18. The non-transitory computer-readable medium of claim 16, wherein the program code for causing the computer to interleave includes:

program code for causing the computer to interleave the plurality of bits of each of the one or more code blocks in time and frequency across a plurality of symbols of a subframe of the time-frequency transmission stream, wherein the plurality of bits of each one of the one or more code blocks is arranged across the two or more symbols of the plurality of symbols of the subframe and across two or more frequencies of a plurality of frequencies of the subframe.

19. The non-transitory computer-readable medium of claim 16, wherein the program code for causing the computer to interleave includes:

program code for causing the computer to interleave the plurality of bits of each of the one or more code blocks across two or more subframes of the time-frequency transmission stream.

20. The non-transitory computer-readable medium of claim 16, wherein each code block of the two or more code blocks has a minimum length of forty bits.

21. The method of claim 1, wherein the transmitter is a transmitter of at least one of a user equipment (UE) or a base station.

22. The method of claim 6, wherein the receiver is a receiver of at least one of a user equipment (UE) or a base station.

23. The apparatus of claim 11, wherein the transmitter is a transmitter of at least one of a user equipment (UE) or a base station.

24. The non-transitory computer-readable medium of claim 16, wherein the transmitter is a transmitter of at least one of a user equipment (UE) or a base station.

* * * * *